(12) United States Patent
Hayashi et al.

(10) Patent No.: US 9,188,251 B2
(45) Date of Patent: Nov. 17, 2015

(54) EXHAUST PIPE

(75) Inventors: Kotaro Hayashi, Ibi-gun (JP); Takumi Domae, Ibi-gun (JP); Kenzo Saiki, Ibi-gun (JP)

(73) Assignee: IBIDEN CO., LTD., Ogaki-shi (JP)

( * ) Notice: Subject to any disclaimer, the term of this patent is extended or adjusted under 35 U.S.C. 154(b) by 751 days.

(21) Appl. No.: 13/421,824

(22) Filed: Mar. 15, 2012

(65) Prior Publication Data

US 2013/0068339 A1    Mar. 21, 2013

(30) Foreign Application Priority Data

Mar. 16, 2011   (JP) .................. 2011-057965

(51) Int. Cl.
| | |
|---|---|
| *F16L 9/14* | (2006.01) |
| *F16L 9/00* | (2006.01) |
| *C09D 7/12* | (2006.01) |
| *C23C 30/00* | (2006.01) |
| *F01N 13/08* | (2010.01) |
| *F01N 13/16* | (2010.01) |
| *C09D 5/44* | (2006.01) |
| *C25D 13/02* | (2006.01) |
| *C25D 13/04* | (2006.01) |
| *C08K 3/22* | (2006.01) |
| *C08K 3/40* | (2006.01) |

(52) U.S. Cl.
CPC ............... *F16L 9/00* (2013.01); *C09D 5/4411* (2013.01); *C09D 5/4484* (2013.01); *C09D 7/1216* (2013.01); *C23C 30/00* (2013.01); *C25D 13/02* (2013.01); *C25D 13/04* (2013.01); *F01N 13/08* (2013.01); *F01N 13/16* (2013.01); *C08K 3/22* (2013.01); *C08K 3/40* (2013.01); *F01N 2260/08* (2013.01); *F01N 2510/00* (2013.01)

(58) Field of Classification Search
CPC .......................................................... F16L 9/14
USPC ..................... 138/140–141, 143, 145–146; 106/18.16; 165/180

See application file for complete search history.

(56) References Cited

U.S. PATENT DOCUMENTS

| | | | | |
|---|---|---|---|---|
| 3,568,723 | A * | 3/1971 | Sowards ...................... | 138/143 |
| 4,039,697 | A * | 8/1977 | Isawa et al. .................. | 427/475 |
| 6,113,998 | A * | 9/2000 | Aizawa et al. ............... | 428/35.9 |
| 6,984,457 | B2 * | 1/2006 | Yamamoto et al. .......... | 428/651 |
| 7,759,436 | B2 * | 7/2010 | December et al. ........... | 525/528 |
| 8,201,584 | B2 * | 6/2012 | Ito et al. ....................... | 138/143 |
| 2003/0129329 | A1 * | 7/2003 | Grossman .................... | 428/34.1 |
| 2008/0107844 | A1 * | 5/2008 | Ito ................................. | 428/34.1 |
| 2010/0005792 | A1 * | 1/2010 | Saiki ............................ | 60/321 |
| 2010/0180799 | A1 | 7/2010 | Saiki | |
| 2011/0000575 | A1 | 1/2011 | Ito et al. | |

FOREIGN PATENT DOCUMENTS

| | | |
|---|---|---|
| CN | 1208811 | 2/1999 |
| EP | 2146069 | 1/2010 |

(Continued)

*Primary Examiner* — Paul R Durand
*Assistant Examiner* — Andrew P Bainbridge
(74) *Attorney, Agent, or Firm* — Mori & Ward, LLP

(57) ABSTRACT

An exhaust pipe includes a metal base material and a surface coating layer formed on a surface of the metal base material. The surface coating layer contains an inorganic glass base material and has a concave portion and a convex portion on a surface of the surface coating layer. The concave portion is lower than a first reference surface. The first reference surface has an average height of the surface of the surface coating layer. The convex portion is located on a peripheral edge portion of the concave portion and surrounds the concave portion. The convex portion is higher than the first reference surface.

13 Claims, 7 Drawing Sheets

(56) References Cited

FOREIGN PATENT DOCUMENTS

| EP | 2213856 | 8/2010 |
|----|---------|--------|
| JP | 2001-349246 | 12/2001 |
| JP | 2003-253475 | 9/2003 |
| JP | 2004-044468 | 2/2004 |
| JP | 2009-133213 | 6/2009 |
| JP | 2009-133214 | 6/2009 |
| JP | 2010-168473 | 8/2010 |

* cited by examiner

US 9,188,251 B2

EXHAUST PIPE

CROSS-REFERENCE TO RELATED APPLICATIONS

The present application claims priority under 35 U.S.C. §119 to Japanese Application 2011-057965, filed on Mar. 16, 2011, the contents of which are incorporated herein by reference in their entirety.

BACKGROUND OF THE INVENTION

1. Field of the Invention

The present invention relates to an exhaust pipe.

2. Discussion of the Background

In order to treat injurious substances such as injurious gases contained in exhaust gases discharged from an engine, a catalyst converter is installed in an exhaust gas passage including an exhaust pipe.

In order to improve the conversion efficiency of injurious substances by the catalyst converter, it is necessary to maintain the temperature of exhaust gases and the temperature of the exhaust pipe and the like through which the exhaust gases is allowed to pass at temperatures suitable for activating the catalyst (hereinafter, referred to also as a catalyst activating temperature).

However, at the time of high speed operation of the engine, the exhaust gas temporarily has such a high temperature as to exceed 1000° C. Therefore, the temperature of the exhaust gases sometimes becomes higher than the upper limit value of the catalyst activating temperature. As a result, problematically, efficient purification of exhaust gases may be difficult and the catalyst may deteriorate.

For this reason, an exhaust pipe connected to an automobile engine needs to be capable of externally radiating heat of the exhaust gases passing through the exhaust pipe at the time of high speed operation of the automobile engine.

JP-A 2009-133213 and JP-A 2009-133214 have disclosed an exhaust pipe having a structure in which a layer composed of a crystalline inorganic material and an amorphous inorganic material is formed on a surface of a cylindrical base material made of a metal.

JP-A 2009-133213 has disclosed an exhaust pipe having a structure in which a layer composed of a crystalline inorganic material and an amorphous inorganic material has infrared-ray emissivity higher than that of the base material so as to provide the exhaust pipe with an excellent heat releasing characteristic.

Moreover, JP-A 2009-133214 has disclosed an exhaust pipe having a structure in which the amorphous inorganic material located on the outer peripheral side from the crystalline inorganic material has an average thickness of 20 μm or less so as to provide the exhaust pipe with an excellent heat releasing characteristic.

The contents of JP-A 2009-133213 and JP-A 2009-133214 are incorporated herein by reference in their entirety.

SUMMARY OF THE INVENTION

According to one aspect of the present invention, an exhaust pipe includes a metal base material and a surface coating layer formed on a surface of the metal base material. The surface coating layer contains an inorganic glass base material and has a concave portion and a convex portion on a surface of the surface coating layer. The concave portion is lower than a first reference surface. The first reference surface has an average height of the surface of the surface coating layer. The convex portion is located on a peripheral edge portion of the concave portion and surrounds the concave portion. The convex portion is higher than the first reference surface.

BRIEF DESCRIPTIONS OF THE DRAWINGS

A more complete appreciation of the invention and many of the attendant advantages thereof will be readily obtained as the same becomes better understood by reference to the following detailed description when considered in connection with the accompanying drawings, FIG. 1A is an explanatory drawing that schematically illustrates a concave portion in an exhaust pipe of the embodiment of the present invention. FIG. 1B is an explanatory drawing that schematically illustrates a peripheral edge portion in the exhaust pipe of the embodiment of the present invention. FIG. 1C is an explanatory drawing that schematically illustrates a concave portion in the exhaust pipe of the embodiment of the present invention.

DESCRIPTION OF THE EMBODIMENTS

Figure 1A:
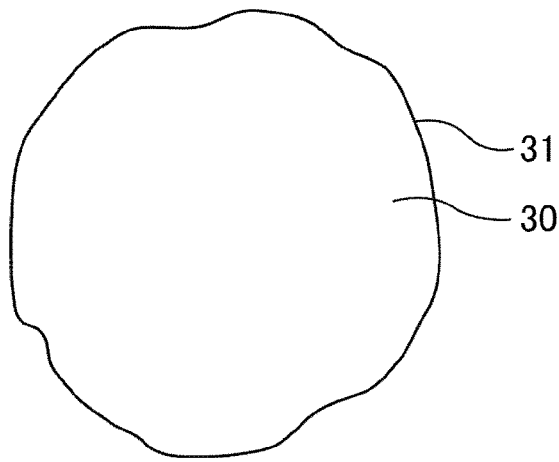

The embodiments will now be described with reference to the accompanying drawings, wherein like reference numerals designate corresponding or identical elements throughout the various drawings.

The inventions disclosed in JP-A 2009-133213 and JP-A 2009-133214 each have realized an exhaust pipe having an excellent heat releasing characteristic. However, there have been still strong demands for an exhaust pipe that is still superior in heat releasing characteristic, and in particular, the development of an exhaust pipe that is by far superior in heat releasing characteristic.

Namely, an exhaust pipe according to an embodiment of the present invention includes: a metal base material; and a surface coating layer formed on a surface of the metal base material, wherein the surface coating layer contains an inorganic glass base material, the surface coating layer has a concave portion on a surface of the surface coating layer, the concave portion being lower than a first reference surface having an average height of the surface of the surface coating layer, and the concave portion is surrounded by a convex portion present on a peripheral edge portion of the concave portion, the convex portion being higher than the first reference surface.

Since the exhaust pipe according to the embodiment of the present invention has concave portions and convex portions formed on the surface of its surface coating layer, the surface area of the exhaust pipe becomes great so that the exhaust pipe is likely to have high apparent emissivity. For this reason, by accelerating the radiant heat transfer, the resultant exhaust pipe is likely to have an excellent heat releasing characteristic.

Moreover, the concave portions formed on the surface of the surface coating layer are likely to serve as a number of non-fixed ends for dispersing thermal stress. Furthermore, by the concave portions formed on the surface of the surface coating layer, portions having smaller film thicknesses are formed in the surface coating layer. Since a temperature difference in each of these portions becomes small in the thickness direction, thermal stress hardly occurs inside the surface coating layer. Therefore, the thermal stress due to thermal impact is easily relieved to easily prevent separation of the surface coating layer. As a result, the exhaust pipe easily maintains a high heat releasing characteristic.

The following description will discuss the "peripheral edge portion".

FIG. 1A is an explanatory drawing that schematically illustrates a concave portion in the exhaust pipe according to the embodiment of the present invention.

Figure 1B:
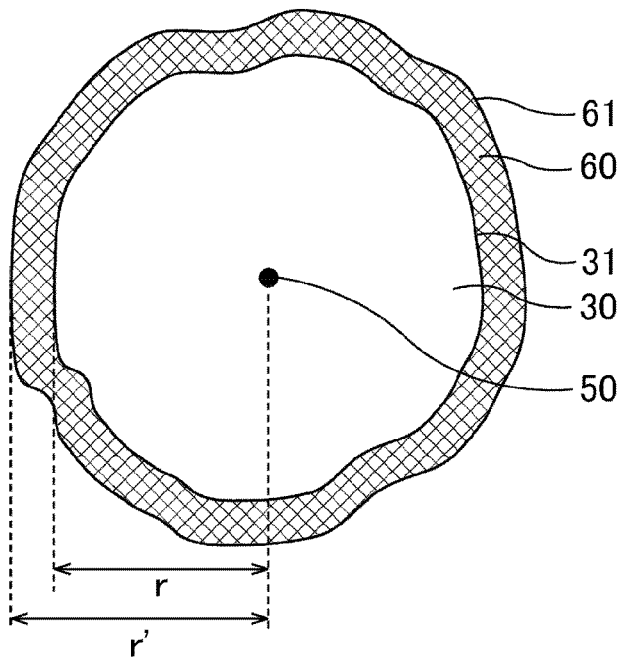

FIG. 1B is an explanatory drawing that schematically illustrates a peripheral edge portion in the exhaust pipe according to the embodiment of the present invention.

FIG. 1A schematically illustrates an appearance of a concave portion 30 when a surface coating layer is observed in the direction perpendicular to the surface of a metal base material. The concave portion 30 forms a rounded graphic form 31.

FIG. 1B illustrates a graphic form 61 that is similar to the graphic form 31. The center of gravity of the graphic form 61 is coincident with the center of gravity of the graphic form 31. The similar ratio (the graphic form 31: the graphic form 61) is r:r', and r'=1.2r is satisfied.

A peripheral edge portion 60 is an area corresponding to an area inside the graphic form 61 from which the concave portion 30 is excluded.

In the exhaust pipe according to the embodiment of the present invention, the convex portions are present on the peripheral edge portion of each concave portion in a manner of surrounding the concave portion. Here, the phrase "the convex portions are present in a manner of surrounding the concave portion" refers to a state where about 60% or more of the peripheral edge portion of the concave portion is occupied by the convex portion. Among the areas of the peripheral edge portion of the concave portions, a ratio of the area occupied by the convex portions is desirably about 80% or more, more desirably about 90% or more, and most desirably 100%. This is because the surface area of the exhaust pipe becomes larger along with the increase in the ratio of the area occupied by the convex portions among the areas of the peripheral edge portion. In the case where the ratio of the area occupied by the convex portions among the areas of the peripheral edge portion is about 60% or more, the heat releasing characteristic of the exhaust pipe is likely to be improved because the surface area of the exhaust pipe is large.

Additionally, the concave portion according to the embodiment of the present invention is an area having a peripheral edge portion in which the convex portions are present, among areas lower than the first reference surface. That is, even in the case where there is an area lower than the first reference surface, if the area has no convex portion on its peripheral edge portion, the area is not a concave portion.

Therefore, in the embodiment of the present invention, all areas lower than the first reference surface are not necessarily required to have convex portions in their peripheral portions. Here, supposing that the areas lower than the first reference surface are referred to as potential concave portions, it is only necessary that the potential concave portions includes an area having convex portions on its peripheral edge portion in the embodiment of the present invention.

In the exhaust pipe according to the embodiment of the present invention, the convex portion is preferably higher than a second reference surface having a height of $(H_{max}-H\times 1/3)$, wherein $H_{max}$ represents a maximum value of the height of the surface coating layer, $H_{min}$ represents a minimum value of the height of the surface coating layer, and $H_{min}$ represents a difference between $H_{max}$ and $H_{min}$.

In the exhaust pipe, convex portions higher than the second reference surface are present on the peripheral edge portion. The second reference surface is a face having a height of $(H_{max}-H\times 1/3)$. Namely, in the exhaust pipe, an area much higher than the concave portion is present on the peripheral edge portion of the concave portion (i.e. comparatively in the vicinity of the concave portion). Therefore, the surface coating layer forms a steep slope from the concave portion to the convex portion. This increases the surface area to increase the apparent emissivity. This increase easily improves the heat releasing characteristic.

In the exhaust pipe according to the embodiment of the present invention, the concave portion preferably has a virtually circular shape when seen in a direction perpendicular to the surface of the metal base material.

This presumably allows the thermal stress due to thermal impact to be easily relieved. In the case where separation has once occurred at an edge portion of the concave portion, if the concave portion has a linear shape, the separation proceeds successively; however, in the case where the concave portion has a virtually circular shape, the separation is less likely to proceed because the separated surface coating layer is pulled by the surface coating layer therearound. As a result, the adhesion between the surface coating layer and the metal base material is likely to be improved.

The following description will discuss "virtually circular shape".

Figure 1C:
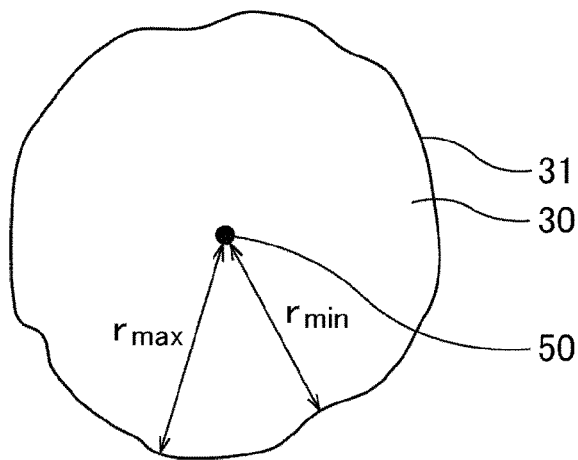

FIG. 1C is an explanatory view that schematically illustrates a concave portion in the exhaust pipe according to the embodiment of the present invention.

FIG. 1C shows the same concave portion 30 as the concave portion 30 shown in FIG. 1A.

In FIG. 1C, $r_{max}$ represents the maximum value of a distance between a point on the graphic form 31 and the center of gravity 50, and $r_{min}$ represents the minimum value of a distance between a point on the graphic form 31 and the center of gravity 50.

The "virtually circular shape" refers to the case where a relationship of $r_{max}$<about $1.5r_{min}$ is satisfied.

In the exhaust pipe according to the embodiment of the present invention, d>0 is preferably satisfied, wherein $H_{min}$ represents a minimum value of the height of the surface coating layer and d represents a distance between a face having a height of $H_{min}$ and the surface of the metal base material.

In the case of d>0, namely, in the case where the metal base material is not exposed on the surface of the exhaust pipe, the effect of improving the emissivity by the concave portion formed on the surface of the surface coating layer is likely to be achieved sufficiently. Moreover, since the metal base material has low emissivity, the effect of improving the emissivity is presumably less likely to be reduced. In the case of d>0, the metal base material having low emissivity is not exposed on the surface, and therefore, deterioration in the heat releasing characteristic is likely to be avoided.

In the exhaust pipe according to the embodiment of the present invention, d≥about 2 μm is preferably satisfied.

A predetermined distance (about 2 μm) or more between the surface of the metal base material having low emissivity and the bottom of the concave portion is likely to provide a sufficient effect of improving the emissivity by the concave portion formed on the surface of the surface coating layer, resulting in high emissivity. Accordingly, deterioration in the heat releasing characteristic is likely to be more effectively avoided.

In the exhaust pipe according to the embodiment of the present invention, the concave portion preferably has a virtually circular shape having a diameter of about 3 μm to about 2000 μm when seen in a direction perpendicular to the surface of the metal base material.

As mentioned above, given that an increase in surface area of the surface coating layer contributes to an improvement in emissivity, desirably, the size of the concave portion is small and the density thereof is high.

However, in the case where the size of the concave portion is too small, the walls of the concave portion are made face to face with each other closely. In such a case, infrared rays radiated upon heating of the surface coating layer are hardly radiated outside of the surface coating layer, resulting in low heat releasing effect. On the other hand, since the emissivity at the concave portion is low corresponding to the small thickness of the surface coating layer, the emissivity of the entire surface coating layer is lowered when the size of the concave portion is too large, leading to a case where a high heat releasing characteristic is less likely to be obtained.

In the exhaust pipe according to the embodiment of the present invention, since the concave portion has an appropriate size (about 3 μm to about 2,000 μm in diameter of circle), the exhaust pipe is likely to have an excellent heat releasing characteristic.

In the exhaust pipe according to the embodiment of the present invention, the density of the concave portions is preferably about 10 pcs/cm² to about 10⁷ pcs/cm².

Given that an increase in surface area of the surface coating layer contributes to an improvement in emissivity, as above mentioned, the density of the concave portions is desirably high. In the case where the density of the concave portions is too low, since an increase in surface area is small, the effect for improving the emissivity is hardly obtained.

On the other hand, in the case where the density of the concave portions is too high, two concave portions are positioned too close to each other so that they may be partially overlapped with each other. When the two concave portions are overlapped with each other, a convex part is formed between the two concave portions. Since this convex part is lower than the first reference surface, such a convex part is not the aforementioned convex portion, and is not continuously formed in a manner of surrounding the concave portion. Consequently, the convex part tends to be a portion that is easily separated. For this reason, separation occurs from the convex part as a starting point with an elapse of time, and the emissivity may possibly be lowered.

In the exhaust pipe according to the embodiment of the present invention, since concave portions are formed at an appropriate density, the exhaust pipe is likely to have an excellent heat releasing characteristic.

In the exhaust pipe according to the embodiment of the present invention, the surface coating layer preferably further contains inorganic particles.

Since the inorganic particles are highly emissive, infrared rays are released strongly upon heating. This is indicated by Stefan-Boltzmann law represented by the following equation (1):

$$q = \epsilon \sigma (T_1^4 - T_2^4) \quad (4)$$

(σ: Stefan-Boltzmann constant . . . 5.67×10⁻⁸ [W/m²·K⁴], q: heat flux [W/m²], ε: emissivity, $T_1$: heating unit temperature [K], $T_2$: heat receiving unit temperature [K]).

Therefore, in an exhaust pipe containing inorganic particles in the surface coating layer, infrared rays are emitted from the inorganic particles in the surface coating layer. Then, the emissivity of the surface coating layer becomes high so that such an exhaust pipe is likely to have an excellent heat releasing characteristic at high temperature.

In the exhaust pipe according to the embodiment of the present invention, the inorganic particles preferably have an average particle size of not more than about 3 μm.

As mentioned above, the inorganic particles have a function for improving emissivity. For this reason, in the case where portions where the inorganic particles are present are projected onto a plane in parallel with the surface of the metal base material, the emissivity becomes greater along with the increase in the area of the projected portions.

If the average particle size of the inorganic particles is great, the inorganic particles are localized in some areas, while the other areas lack the inorganic particles. In this case, the above area is small. Consequently, the emissivity is lowered.

That is, in the case where the ratio of the inorganic particles contained in the surface coating layer is constant, the area becomes larger along with the reduction in the average particle size of the inorganic particles.

In the exhaust pipe according to the embodiment of the present invention, since the inorganic particles having an average particle size of about 3 μm or less are used, the exhaust pipe is likely to have an excellent heat releasing characteristic at high temperature.

In the exhaust pipe according to the embodiment of the present invention, the inorganic particles preferably have an average interparticle distance of not more than about 3 μm.

As mentioned above, the inorganic particles have a function for improving emissivity. For this reason, in the case where portions where the inorganic particles are present are projected onto a plane in parallel with the surface of the metal base material, the emissivity becomes greater along with the increase in the area of the projected portions.

If the interparticle distance of the inorganic particles is great, the inorganic particles are localized in some areas, while the other areas lack the inorganic particles. In this case, the above area is small. Consequently, the emissivity is lowered.

That is, in the case where the ratio of the inorganic particles contained in the surface coating layer is constant, the area becomes larger along with the reduction in the interparticle distance of the inorganic particles.

In the exhaust pipe according to the embodiment of the present invention, since the average interparticle distance of the inorganic particles is small as 3 µm, the exhaust pipe is likely to have an excellent heat releasing characteristic at high temperature.

In the exhaust pipe according to the embodiment of the present invention, the inorganic particles are preferably oxides of a transition metal.

In the exhaust pipe according to the embodiment of the present invention, the inorganic glass base material preferably has a softening point of about 300° C. to about 1000° C.

A description is given on an exhaust pipe according to one embodiment of the present invention.

Figure 2:
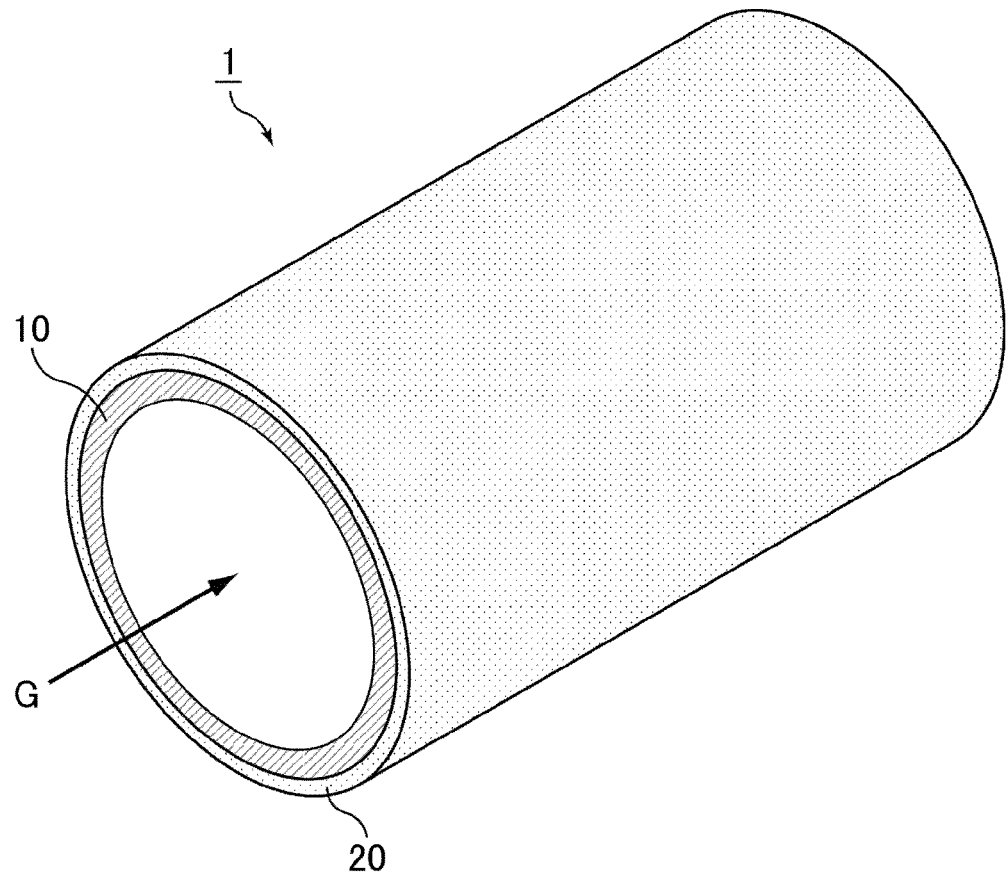
FIG. 2 is a perspective view that schematically illustrates an exhaust pipe of the embodiment of the present invention.

FIG. 2 is a perspective view that schematically illustrates an exhaust pipe according to the embodiment of the present invention.

Figure 3:
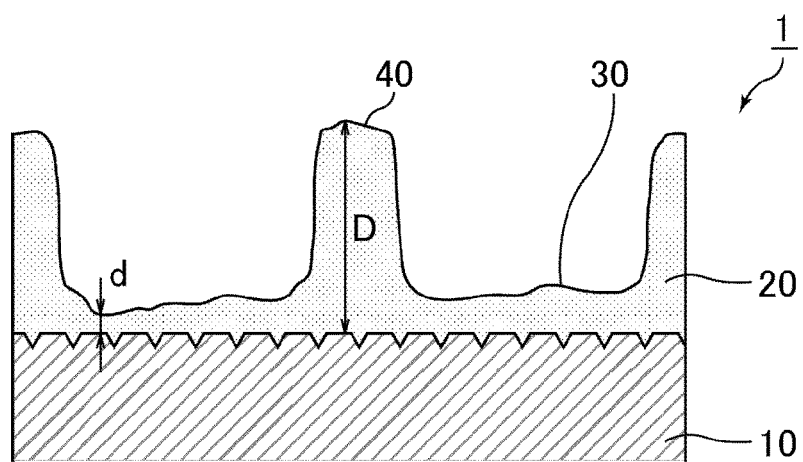
FIG. 3 is a partially enlarged cross-sectional view that schematically illustrates a cross section obtained by cutting the exhaust pipe shown in FIG. 2 in its longitudinal direction.

FIG. 3 is a partially enlarged cross-sectional view that schematically illustrates a cross section obtained by cutting the exhaust pipe shown in FIG. 2 in its longitudinal direction.

In FIG. 2, an exhaust gas is indicated by G and the flowing direction of the exhaust gas is indicated by arrows.

An exhaust pipe 1 shown in FIG. 2 is constituted by a substantially cylindrical metal base material 10 and a surface coating layer 20 formed on the outer peripheral face of the metal base material 10 with a predetermined thickness.

Examples of the material for the metal base material include, but are not particularly limited to; metals such as stainless steel, steel, iron and copper; and nickel alloys such as Inconel, Hastelloy and Invar. Since these metal materials have high thermal conductivity, use of any of these is likely to contribute to an improvement in heat releasing characteristic of an exhaust pipe.

As shown in FIG. 3, on the surface of the metal base material 10, irregularities are desirably formed. The surface roughness $Rz_{JIS}$ (JIS B 0601: 2001) of the outer peripheral face of the metal base material having these irregularities is desirably about 1.5 µm to about 15.0 µm.

In the case where the surface roughness $Rz_{JIS}$ of the outer peripheral face of the metal base material is about 1.5 µm or more, since the surface area of the metal base material is large, the adhesion between the metal base material and the surface coating layer is likely to be achieved. On the other hand, in the case where the surface roughness $Rz_{JIS}$ of the outer peripheral face of the metal base material is about 15.0 µm or less, voids are less likely to be formed between the surface of the metal base material and the surface coating layer. This is presumably because when the surface roughness $Rz_{JIS}$ of the outer peripheral face of the metal base material is not too high, the paint easily enters the concave portions of the irregularities formed on the surface of the metal base material. If the voids are formed between the surface of the metal base material and the surface coating layer, the adhesion between the metal base material and the surface coating layer becomes insufficient.

The surface coating layer 20 contains an inorganic glass base material.

The inorganic glass base material is preferably a low melting glass having a softening point of about 300° C. to about 1000° C. Examples of the low melting glass include, but are not particularly limited to, soda-lime glass, non-alkali glass, borosilicate glass, potash glass, crystal glass, titanium crystal glass, barium glass, boron glass, strontium glass, alumina silicate glass, soda zinc glass, and soda barium glass. These glasses may be used alone, or two or more kinds of these may be used in combination.

In the case where the above-mentioned low melting glass has a softening point in a range from about 300° C. to about 1000° C., a surface coating layer is likely to be firmly and easily formed on the outer peripheral face of the base material by application (coating) of the molten low melting glass onto the outer peripheral face of a metal base material followed by a heating and firing treatment thereof.

In the case where the softening point of the low melting glass is about 300° C. or higher, the low melting glass used in an exhaust pipe does not easily soften upon application of heat. In such a case, when external foreign matters such as stone and sand are brought into contact with the softened glass, they tend not to be easily attached to the glass. If the foreign matters are attached to the surface, the surface coating layer having high radiation rate is covered with the foreign matters, failing to provide an exhaust pipe having an excellent heat releasing characteristic at high temperature.

On the other hand, in the case where the softening point of the low melting glass is about 1000° C. or lower, since a heating treatment may be conducted at a heating temperature of less than about 1000° C., the metal base material is less likely to deteriorate due to exposure to high temperature in the heating treatment upon forming a surface coating layer of the exhaust pipe.

Additionally, the softening point of the low melting glass can be measured by using, for example, an automatic measuring apparatus of glass softening and strain points (SSPM-31) manufactured by OPT Corporation, in accordance with a method according to JIS R 3103-1:2001.

Examples of the borosilicate glass include, but are not particularly limited to, $SiO_2$—$B_2O_2$—ZnO glass and $SiO_2$—$B_2O_2$—$Bi_2O_2$ glass. The crystal glass refers to glass containing PbO, and examples thereof include, but are not particularly limited to, $SiO_2$—PbO glass, $SiO_2$—PbO—$B_2O_2$ glass, and $SiO_2$—$B_2O_2$—PbO glass.

Examples of the boron glass include, but are not particularly limited to, $B_2O_3$—ZnO—PbO glass, $B_2O_3$—ZnO—$Bi_2O_3$ glass, $B_2O_3$—$Bi_2O_3$ glass, and $B_2O_2$—ZnO glass. Examples of the barium glass include, but are not particularly limited to, BaO—$SiO_2$ glass.

The surface coating layer 20 desirably contains inorganic particles.

As the inorganic particles, particles of an oxide of a transition metal are desirably used. More desirably, the oxide is at least one kind of oxides of manganese, iron, copper, cobalt, chromium and nickel.

These inorganic particles may be used alone, or two or more of these may be used in combination.

Since the oxides of these transition metals are highly emissive, infrared rays are strongly irradiated upon heating so that the heat releasing characteristic of the exhaust pipe owing to radiant heat transfer is likely to be improved.

The inorganic particles in the surface coating layer 20 desirably have an average interparticle distance of about 3 µm or less.

The inorganic particles have a function for improving emissivity. For this reason, in the case where portions where the inorganic particles are present are projected onto a plane in parallel with the surface of the metal base material, the emissivity becomes greater along with the increase in the area of the projected portions.

If the interparticle distance of the inorganic particles is great, the inorganic particles are localized in some areas, while the other areas lack the inorganic particles. In this case, the above area is small. Consequently, the emissivity is lowered.

That is, in the case where the ratio of the inorganic particles contained in the surface coating layer is uniform, the area becomes larger along with the reduction in the interparticle distance of the inorganic particles.

In the case where the inorganic particles have an average interparticle distance of about 3 µm or less, since the interparticle distance of the inorganic particles is not too large, an exhaust pipe 1 is likely to have a desired heat releasing characteristic.

However, the inorganic particles in the surface coating layer may have an average interparticle distance of exceeding about 3 μm.

The inorganic particles in the surface coating layer have an average interparticle distance of desirably about 0.1 μm or more. If the average of the interparticle distance is about 0.1 μm or more, thermal stress is not great in areas among the particles upon heating and cooling, which may not cause a crack in an inorganic glass material. When a crack occurs in the inorganic glass material, another crack may be caused in the surface coating layer starting from the crack and dropping off of the layer may be caused, failing to provide an exhaust pipe having high emissivity.

As shown in FIG. 3, concave portions 30 and convex portions 40 are present on the surface of the surface coating layer 20.

Figure 4A:
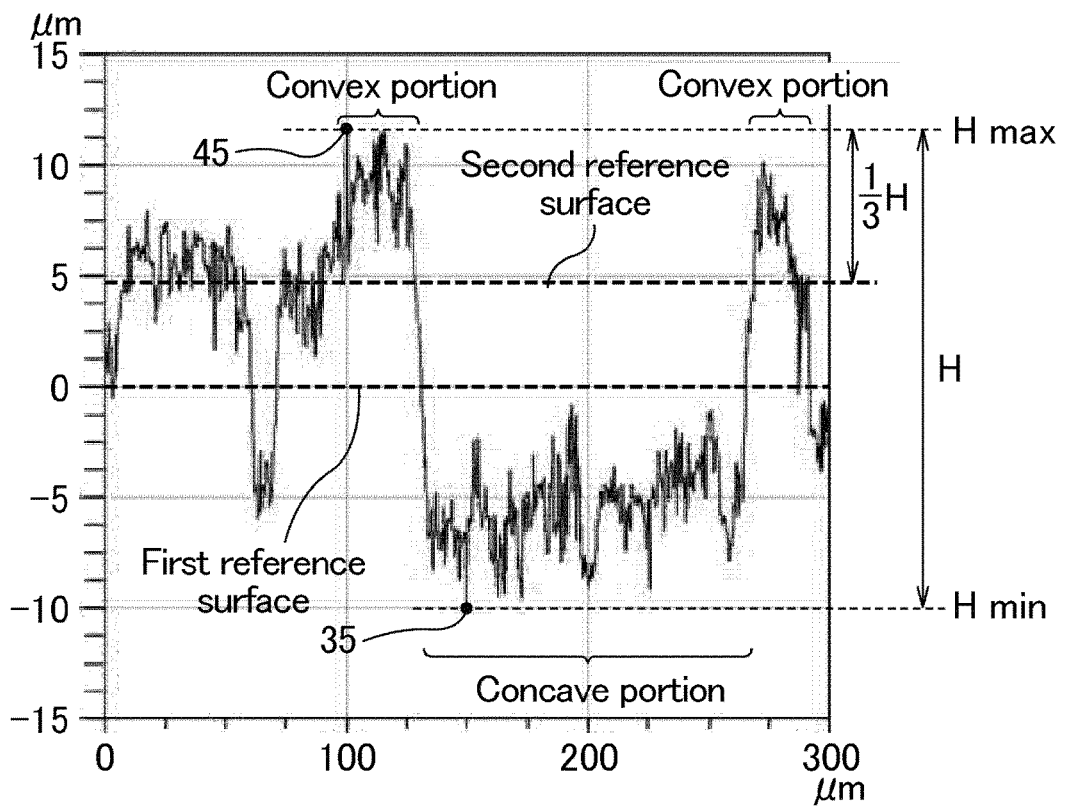
FIG. 4A is a partially enlarged cross-sectional view that illustrates a cross section obtained by cutting the exhaust pipe shown in FIG. 2 in its longitudinal direction.
Figure 4B:
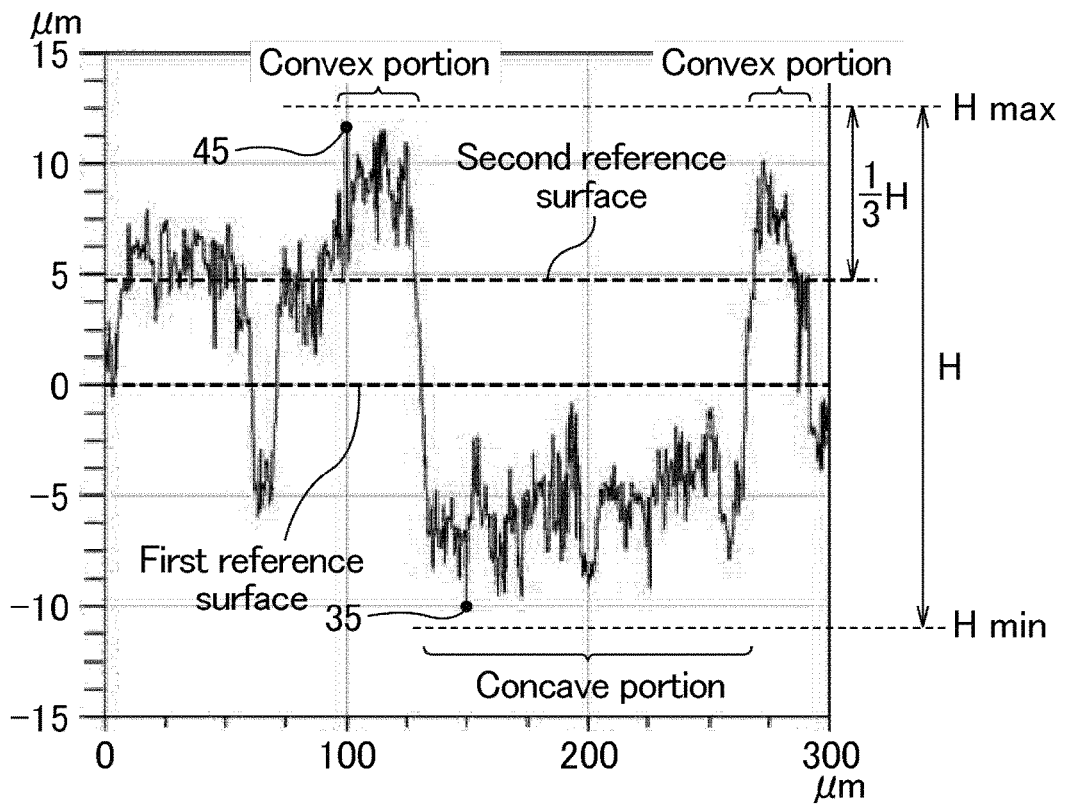
FIG. 4B is a partially enlarged cross-sectional view that illustrates a cross section obtained by cutting the exhaust pipe shown in FIG. 2 in its longitudinal direction.
Figure 5:
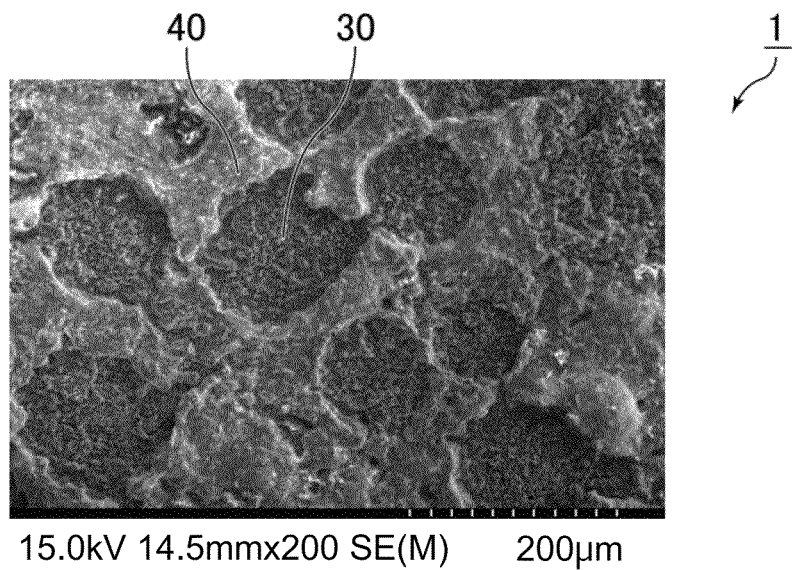
FIG. 5 is a photograph of the exhaust pipe of FIG. 2, taken in the direction perpendicular to the surface of the metal base material.

Referring to FIG. 4A, FIG. 4B, and FIG. 5, the following description will discuss the concave portions 30 and the convex portions 40.

FIG. 4A and FIG. 4B are partially enlarged cross-sectional views, each illustrating a cross section obtained by cutting the exhaust pipe shown in FIG. 2 in its longitudinal direction.

FIG. 5 is a photograph of the exhaust pipe of FIG. 2, taken in the direction perpendicular to the surface of the metal base material.

The photograph shown in FIG. 5 is taken by an electron microscope at an accelerating voltage of 15.0 kV and at 200× magnification.

As shown in FIG. 4A and FIG. 4B, the concave portions 30 correspond to areas lower than a first reference surface, and the first reference surface is a surface having an average height of the surface of the surface coating layer 20.

In FIG. 4A and FIG. 4B, the first reference surface represents an average line.

The average line corresponds to an average line for use in defining a cross-sectional curve in accordance with JIS B601 (2001), and is a curve representing a nominal profile applied to the cross-sectional curve using a least square method.

The nominal profile indicates a shape such as an inclination of a plane, and an arc shape of a cylindrical part.

The average line is automatically calculated by measuring a surface shape using a commercially available surface roughness measuring device (such as Wyko NT9100 (optical device), manufactured by Veeco Instruments) to obtain a cross-sectional curve.

The concave portion desirably has a virtually circular shape when seen in the direction perpendicular to the surface of the metal base material.

In the case where separation has once occurred at an edge portion of the concave portion, if the concave portion has a linear shape, the separation successively proceeds; however, in the case where the concave portion has a virtually circular shape, the separation hardly proceeds because the separated surface coating layer is pulled by the peripheral surface coating layer. Therefore, when the concave portion has a virtually circular shape, the adhesion between the surface coating layer and the metal base material is likely to be improved.

As shown in FIG. 5, the concave portion 30 has a round shape (virtually circular shape) when seen in the direction perpendicular to the surface of the metal base material 10. In the present description, such a shape of the concave portion 30 is referred to as a "virtually circular shape".

When the shape of the concave portion viewed in the direction perpendicular to the surface of the metal base material is substantially a circle (virtually circular shape), the diameter of the circle is desirably about 3 μm to about 2000 μm.

Given that an increase in surface area of the surface coating layer contributes to an improvement in emissivity, the size of the concave portion is desirably small and the density thereof is desirably high.

However, in the case where the size of the concave portion is too small, the walls of the concave portion are made face to face with each other closely. In such a case, infrared rays radiated upon heating of the surface coating layer are hardly radiated outside of the surface coating layer so that the heat releasing effect becomes small. On the other hand, since the emissivity at the concave portion is low corresponding to the small thickness of the surface coating layer, the emissivity of the entire surface coating layer is lowered when the size of the concave portion is too large, leading to a case where a high heat releasing characteristic is less likely to be obtained.

In the case where the diameter of the circle is from about 3 μm to about 2000 μm, an obtained exhaust pipe is likely to be excellent in heat releasing characteristic.

The diameter of the circle is more desirably about 1000 μm or less, and furthermore desirably about 120 μm or less.

The diameter of the circle corresponds to the maximum length of a straight line drawn inside the circle.

The density of the concave portions is desirably about 10 pcs/cm$^2$ to about $10^7$ pcs/cm$^2$.

Given that an increase in surface area of the surface coating layer contributes to an improvement in emissivity, the density of the concave portions is desirably high. In the case where the density of the concave portions is too low, since an increase in surface area is small, the effect for improving the emissivity is hardly obtained.

On the other hand, in the case where the density of the concave portions is too high, two concave portions are made too close to each other so that they may be partially overlapped with each other. When the two concave portions are overlapped with each other, a convex part is formed between the two concave portions. Since this convex part is lower than the first reference surface, this convex part is not the aforementioned convex portion, and is not continuously formed in a manner of surrounding the concave portion. Consequently, the convex part tends to be a portion that is easily separated. For this reason, separation occurs from the convex part as a starting point with an elapse of time, and the emissivity may possibly be lowered.

In the case where the density of the concave portions is from about 10 pcs/cm$^2$ to about $10^7$ pcs/cm$^2$, an obtained exhaust pipe is likely to have an excellent heat releasing characteristic.

The density of the convex portions is more desirably about $1\times10^2$ pieces/cm$^2$ or more, and furthermore desirably about $5\times10^2$ pcs/cm$^2$ or more.

Supposing that the distance between the surface having a height of $H_{min}$ (see FIG. 4A and FIG. 4B) and the surface of the metal base material is defined as d (see FIG. 3), d>0 is desirably satisfied, and more desirably, d≥about 2 μm is satisfied. $H_{min}$ is the minimum value of the surface height of the surface coating layer.

In the case of d>0, since the metal base material is not exposed on the surface of the exhaust pipe, the effect for improving the emissivity exerted by the concave portions formed on the surface of the surface coating layer is likely to be sufficiently obtained. Moreover, since the emissivity of the metal base material exposed on the surface is low, the effect for improving the emissivity is presumably less likely to be small. Therefore, in the case of d>0, lowering of the releasing characteristic is easily prevented.

In the present description, the distance d between the surface having the height of $H_{min}$ and the surface of the metal base material is referred to also as "film thickness of the concave portion". Moreover, a distance D between the surface having the height of $H_{max}$ and the surface of the metal base material is referred to also as "film thickness of the surface coating layer".

Moreover, in the case of film thickness of the concave portion d=0, such a state is referred to as "the concave portion penetrates the surface coating layer".

As shown in FIG. 4A and FIG. 4B, the convex portions 40 are areas higher than a second reference surface. The second reference surface is a surface having a height of $(H_{max}-H\times 1/3)$.

$H_{max}$ is the maximum value of the surface height of the surface coating layer 20. H is a difference between $H_{max}$ and $H_{min}$, and $H_{min}$ is the minimum value of the surface height of the surface coating layer 20.

As shown in FIG. 4A and FIG. 4B, the surface coating layer forms a steep slope from a concave portion to a convex portion.

In this case, $H_{max}$ is a height of the highest point in the entire surface of the surface coating layer 20. $H_{min}$ is a height of the lowest point in the entire surface of the surface coating layer 20.

FIG. 4A shows the case where the highest point 45 in the cross section corresponds to the highest point in the entire surface of the surface coating layer 20, and the lowest point 35 in the cross section corresponds to the lowest point in the entire surface of the surface coating layer 20.

FIG. 4B shows the case where the highest point in the entire surface of the surface coating layer 20 is higher than the highest point 45 in the cross section, and the lowest point in the entire surface of the surface coating layer 20 is lower than the lowest point 35 in the cross section.

The above description has discussed the concave portions 30 and the convex portion 40 of the exhaust pipe 1 according to the embodiment of the present invention.

In the present embodiment, convex portions are present on the peripheral edge portion of each concave portion. A description has been already given on the peripheral edge portion with reference to FIG. 1A and FIG. 1B.

A description is given on a method for manufacturing the exhaust pipe according to the embodiment of the present invention.

In a method for manufacturing the exhaust pipe according to the embodiment of the present invention, a predetermined paint is used.

The paint in accordance with the present embodiment will be described in the following.

The paint in accordance with the exhaust pipe according to the embodiment of the present invention contains inorganic glass particles and an electrocoating resin.

In the method for manufacturing the exhaust pipe according to the embodiment of the present invention, a coat film is formed on a surface of a metal base material by carrying out electrocoating using a paint containing an electrocoating resin. Thereafter, the coat film is heated to a temperature that is not lower than the burning-out temperature of the electrocoating resin, and the coat film is then further heated to a temperature that is not lower than the softening point of inorganic glass particles. As a result, a surface coating layer having concave portions formed on its surface is formed.

Referring to FIG. 6A, FIG. 6B, and FIG. 7A to FIG. 7E, the following description will discuss the reason why the concave portions are formed on the surface of the exhaust pipe manufactured using the paint according to the exhaust pipe according to the embodiment of the present invention.

Figure 6A:
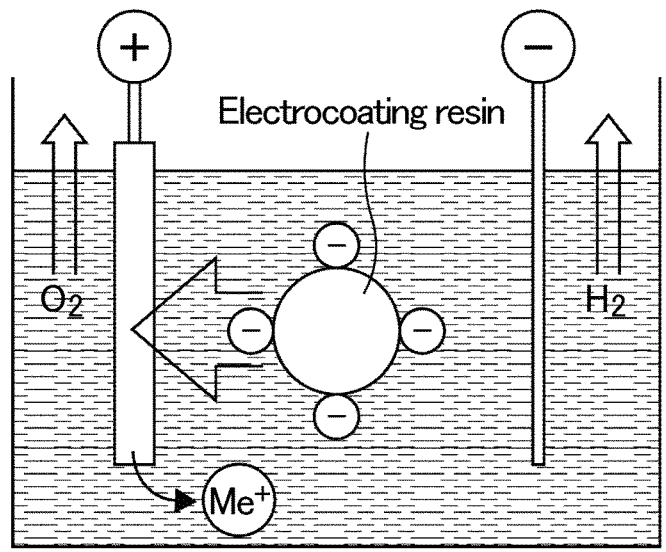
FIG. 6A is an explanatory drawing that schematically illustrates an anionic electrocoating process according to an embodiment of the present invention.

FIG. 6A is an explanatory drawing that schematically illustrates the process of anionic electrocoating according to the embodiment of the present invention.

Figure 6B:
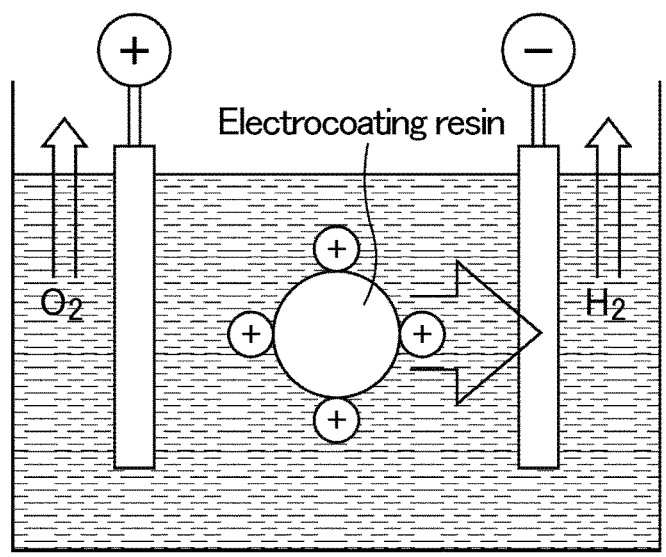
FIG. 6B is an explanatory drawing that schematically illustrates a cationic electrocoating process according to the embodiment of the present invention.

FIG. 6B is an explanatory drawing that schematically illustrates the process of cationic electrocoating according to the embodiment of the present invention.

FIG. 7A to FIG. 7E are explanatory drawings that illustrate an exemplary manufacturing procedure of the exhaust pipe according to the embodiment of the present invention.

As shown in FIG. 6A and FIG. 6B, the electrocoating process includes an anionic electrocoating process and a cationic electrocoating process.

Additionally, in the example shown in FIG. 7A to FIG. 7E, an anionic electrocoating resin is used as the electrocoating resin; however, a cationic electrocoating resin may also be used as the electrocoating resin. Moreover, a paint and a surface coating layer contain inorganic particles in the example; however, inorganic particles are not necessarily required to be contained.

In the anionic electrocoating process, an anionic electrocoating resin is used as the electrocoating resin.

The anionic electrocoating resin has a functional group (for example, carboxyl group) that reacts with a base to form a salt and is negatively charged by neutralization with a base (for example, organic amine) (see the following formula (2)):

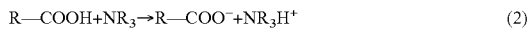

A metal base material and an electrode plate are placed in an electrocoating vessel and a current is applied thereto so that the electrocoating resin negatively charged is attracted toward the anode (see FIG. 6A). Then, inorganic glass particles and the like contained in a paint are carried onto the surface of the metal base material (object to be coated) together with the electrocoating resin. When the electrocoating resin is brought into contact with the surface of the metal base material, the following reactions (3) and (4) proceed:

Consequently, since the electrocoating resin becomes insoluble, the inorganic glass particles and the like are deposited on the surface of the metal base material (anode).

In contrast, in the cationic electrocoating process, a cationic electrocoating resin is used as the electrocoating resin.

Since the cationic electrocoating resin is positively charged to be attracted toward the cathode (see FIG. 6B), the inorganic glass particles and the like are deposited on the surface of the metal base material (cathode).

Figure 7A:
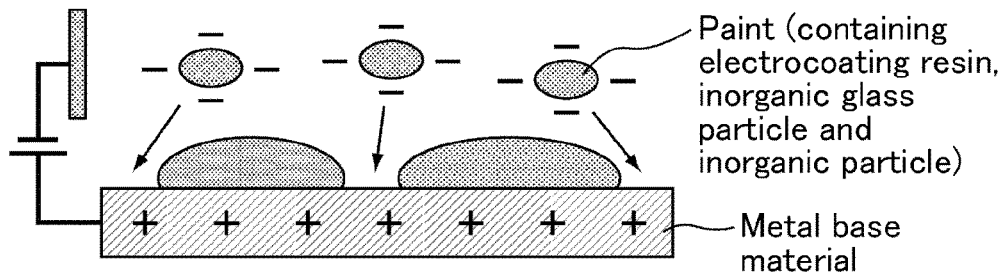
FIG. 7A to FIG. 7E are explanatory drawings that illustrate an exemplary manufacturing procedure of the exhaust pipe of the embodiment of the present invention.
Figure 7B:
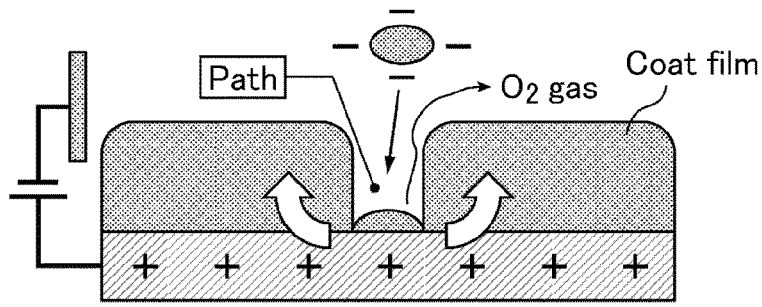
Figure 7C:
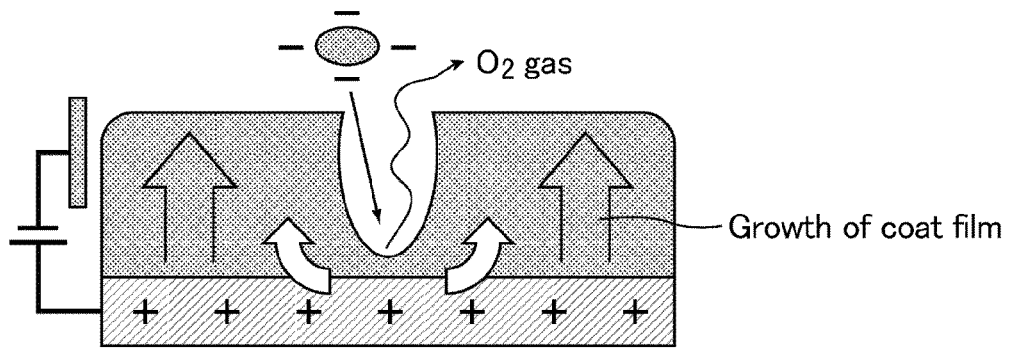
Figure 7D:
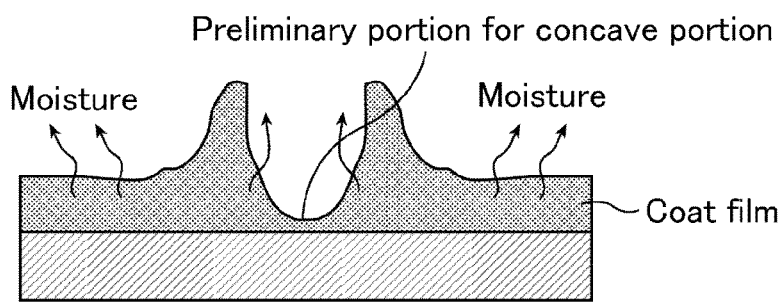
Figure 7E:
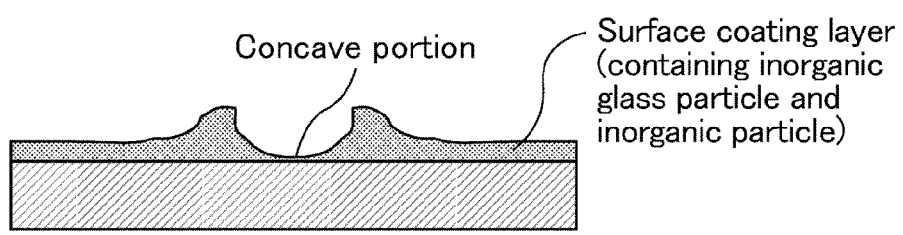

As described above, in the electrocoating process, the electrocoating resin carries the inorganic glass particles and the like onto the surface of the metal base material (see FIG. 7A). Then, the electrocoating resin is brought into contact with the surface of the metal base material, and deposited on the surface of the metal base material (see FIG. 7B and FIG. 7C). At this time, paths through which the soluble electrocoating resin is allowed to pass are formed in the coat film (see FIG. 7B and FIG. 7C). As shown in the reaction formula (3), when the electrocoating resin is brought into contact with the surface of the metal base material, an oxygen gas is generated. These paths are formed when the oxygen gas thrusts the coat film that has already been formed aside to get into the coating solution. In the case where the electrocoating resin remains inside the paths after the electrocoating process, since the electrocoating resin is not deposited on the surface of the metal base material and is soluble, the resin may be washed away with water.

Thereafter, when the coat film is heated, the electrocoating resin is burned out so that the volume of the coat film is contracted. During this process, the concave portions are formed in accordance with the paths (see FIG. 7D and FIG. 7E).

The description has been given on how the concave portions are formed on the surface of the exhaust pipe according to the embodiment of the present invention, which is manufactured using the paint according to the exhaust pipe according to the embodiment of the present invention.

The description is continuously given on the paint according to the exhaust pipe according to the embodiment of the present invention.

The average particle size of the inorganic glass particles is not particularly limited, and is preferably not larger than about 3 µm.

In the case where the average particle size of the inorganic glass particles is about 3 µm or less, the sizes of particles are less likely to be varied. In this case, during the electrocoating process, since the flow of the coating film is less likely to be locally disturbed, paths are easily formed. As a result, concave portions are likely to be formed on the surface of the exhaust pipe.

Moreover, in the case where the average particle diameter of the inorganic glass particles is about 3 µm or less, at the time of firing, softened inorganic glass particles are less likely to fill in the concave portions on the surface of the exhaust pipe so that concave portions are less likely to be unfavorably formed on the surface of the exhaust pipe.

Moreover, in the case where the average particle size of the inorganic glass particles is about 3 µm or less, at the time of firing, inorganic glass particles may be easily stabilized in the paint solution.

The average particle size of the inorganic glass particles is desirably about 0.1 µm or more. In the case where the average particle size of the inorganic glass particles is about 0.1 µm or more, the glass component is less likely to be eluted in the paint so as not to adversely affect the stability of the paint.

The paint preferably further contains the inorganic particles.

The average particle size of the inorganic particles and the average particle size of the inorganic glass particles are not particularly limited, and one or both of them may be larger than about 3 µm; however, desirably, the average particle size of the inorganic particles is about 3 µm or less, and the average particle size of the inorganic glass particles is about 3 µm or less.

More desirably, the average particle size of the inorganic particles is about 1 µm or less, and the average particle size of the inorganic glass particles is about 1 µm or less. Furthermore desirably, the average particle size of the inorganic particles is about 0.9 µm or less, and the average particle size of the inorganic glass particles is about 0.8 µm or less.

In the case where both of the average particle sizes of the inorganic particles and of the inorganic glass particles is about 3 µm or less, the sizes of particles are less likely to be varied. In this case, during the electrocoating process, since the flow of the coating film is less likely to be locally disturbed, paths are easily formed. As a result, concave portions are easily formed on the surface of the exhaust pipe.

Moreover, in the case where the average particle size of the inorganic glass particles is about 3 µm or less, at the time of firing, softened inorganic glass particles are less likely to fill in the concave portions on the surface of the exhaust pipe so that concave portions are less likely to be unfavorably formed on the surface of the exhaust pipe.

Moreover, in the case where the average particle size of the inorganic particles is about 3 µm or less, at the time of firing, solid inorganic particles are dispersed in the inorganic glass particles softened to liquid form. In this case, when the inorganic particles are small, composite particles of the softened inorganic glass particles and the inorganic particles have high viscosity and poor flowability in comparison with the case where the inorganic particles are large, so that the composite particles are less likely to fill in the concave portions on the surface of the exhaust pipe. When the concave portions are filled, the surface area of the surface coating layer becomes small, causing a reduction in emissivity.

Moreover, the average particle size of the inorganic particles is desirably about 0.1 µm or more. The average particle size of the inorganic glass particles is desirably about 0.1 µm or more.

The average particle size of the inorganic particles and the average particle size of the inorganic glass particles can be measured by using, for example, a Shimadzu nano-particle size distribution measuring apparatus (SALD-7100) manufactured by SHIMADZU Corporation.

The amount of the inorganic glass particles blended is about 40% by weight as a desirable lower limit and about 99.5% by weight as a desirable upper limit relative to the total weight of the powder of the inorganic glass particles and the powder of the inorganic particles.

The inorganic glass particles correspond to a material that softens in the firing treatment to form a matrix. The inorganic glass particles are formed into the inorganic glass base material in the firing treatment.

In the case where the amount of the inorganic glass particles blended is about 40% by weight or more, since the amount of the inorganic glass particles is not too small relative to the amount of the inorganic particles, a matrix is easily formed sufficiently so that the inorganic glass particles easily fill in gaps among the inorganic particles, and thus a surface coating layer with few voids is likely to be formed. The surface coating layer with many voids causes a reduction in strength of the surface coating layer, failing to provide adhesion.

Moreover, in the case where the amount of the inorganic glass particles blended is about 40% by weight or more, since the amount of the inorganic glass particles that are brought into contact with a metal base material is not too small so that a reduction in the contact area between the softened inorganic glass particles and the metal base material during the firing process are less likely to be caused. As a result, the surface coating layer is likely to be sufficiently bonded onto the metal base material. Consequently, at the time of firing or upon loading thermal impact, the surface coating layer is less likely to easily drop off (to be separated).

On the other hand, when the amount of the inorganic glass particles blended is about 99.5% by weight or less, the amount of the inorganic particles is not too small, and the heat releasing characteristic of the manufactured exhaust pipe is less likely to deteriorate.

The amount of the inorganic glass particles blended is about 60% by weight as a more desirable lower limit and about 80% by weight as a more desirable upper limit.

The paint may not contain the inorganic particles. Even in this case, as described with reference to FIG. 7A to FIG. 7E, it is possible to obtain an exhaust pipe having an excellent heat releasing characteristic to a certain degree because of the electrocoating resin contained in the paint.

In the case where the inorganic particles are contained in the paint, the amount of the inorganic particles blended is about 0.5% by weight as a desirable lower limit and about 60% by weight as a desirable upper limit relative to the total weight of the powder of the inorganic glass particles and the powder of the inorganic particles.

In the case where the amount of the inorganic particles blended is about 0.5% by weight or more, since the amount of the inorganic particles is not too small relative to the amount of the inorganic glass particles, the heat releasing characteristic of the exhaust pipe is less likely to be deteriorated. On the other hand, in the case where the amount of the inorganic particles blended is about 60% by weight or less, the amount of the inorganic glass particles that contribute to bonding between the surface coating layer and the metal base material is not too small. As a result, the surface coating layer in the manufactured exhaust pipe is less likely to drops off.

The amount of the inorganic particles blended is about 20% by weight as a more desirable lower limit and about 40% by weight as a more desirable upper limit.

The electrocoating resin is desirably prepared as an anionic electrocoating resin.

The anionic electrocoating resin has an anionic group. The anionic group is a functional group that reacts with a base to form a salt. Examples of the anionic group include, but are not particularly limited to, a carboxyl group, a sulfonic acid group, and a phosphoric acid group.

Moreover, examples of the anionic electrocoating resin include, but are not particularly limited to, an acrylic resin, an epoxy resin, a polyurethane resin, a maleic resin, a polyester resin, and a polybutadiene resin.

Examples of the acrylic resin include, but are not particularly limited to, copolymer acrylic resins obtained by polymerizing a monomer composition including a carboxyl group-containing ethylene polymerizable monomer and another ethylene polymerizable monomer.

Examples of the carboxyl group-containing ethylene polymerizable monomer include, but are not particularly limited to, (meth)acrylic acid, a (meth)acrylic acid dimer, crotonic acid, 2-(meth)acryloyloxyethylphthalic acid, 2-(meth)acryloyloxyethyl succinic acid, 2-(meth)acryloyloxyethyl acid phosphate, 2-(meth)acrylamide-2-methylpropane sulfonic acid, ω-carboxy-polycaprolactone mono(meth)acrylate, isocrotonic acid, α-hydro-ω-((1-oxo-2-propenyl)oxy)poly(oxy (1-oxo-1,6-hexanediyl), maleic acid, fumaric acid, itaconic acid, 2-vinylsalicylic acid, and 3-vinylacetyl salicylic acid. These may be used alone, or two or more kinds of these may be used in combination.

Examples of the another ethylene polymerizable monomer include, but are not particularly limited to, (meth)acrylates having an ester unit with one or more carbon atoms (for example, methyl(meth)acrylate, ethyl(meth)acrylate, n-propyl(meth)acrylate, isopropyl(meth)acrylate, n-butyl(meth) acrylate, isobutyl(meth)acrylate, t-butyl(meth)acrylate, 2-ethylhexyl(meth)acrylate, lauryl(meth)acrylate, phenyl (meth)acrylate, isobornyl(meth)acrylate, cyclohexyl(meth) acrylate, t-butylcyclohexyl(meth)acrylate, dicyclopentadienyl(meth)acrylate, dihydrodicyclopentadienyl(meth) acrylate, etc.), polymerizable amide compounds (for example, (meth)acrylamide, N-methylol(meth)acrylamide, N,N-dimethyl(meth)acrylamide, N,N-dibutyl(meth)acrylamide, N,N-dioctyl(meth)acrylamide, N-monobutyl(meth) acrylamide, N-monooctyl(meth)acrylamide, 2,4-dihydroxy-4'-vinylbenzophenone, N-(2-hydroxyethyl)(meth) acrylamide, etc.), polymerizable aromatic compounds (for example, styrene, α-methyl styrene, t-butyl styrene, parachlorostyrene, vinyl naphthalene, etc.), polymerizable nitriles (for example, (meth)acrylonitrile, etc.), α-olefins (for example, ethylene, propylene, etc.), vinyl esters (for example, vinyl acetate, vinyl propionate, etc.), dienes (for example, butadiene, isoprene, etc.), hydroxyethyl(meth)acrylate, hydroxypropyl(meth)acrylate, hydroxybutyl(meth)acrylate, allyl alcohol, (meth)acryl alcohol, and adducts of hydroxyethyl(meth)acrylate and ε-caprolactone. These may be used alone, or two or more of these may be used in combination.

In the case where two or more kinds of (meth)acrylates are used in combination as the (meth)acrylate having an ester unit with one or more carbon atoms, (meth)acrylate having an ester unit with one or two carbon atoms is desirably included in the two or more kinds of (meth)acrylates.

In particular, when inorganic particles are contained in the paint, the electrocoating resin is desirably prepared as an anionic electrocoating resin.

Figure 8:
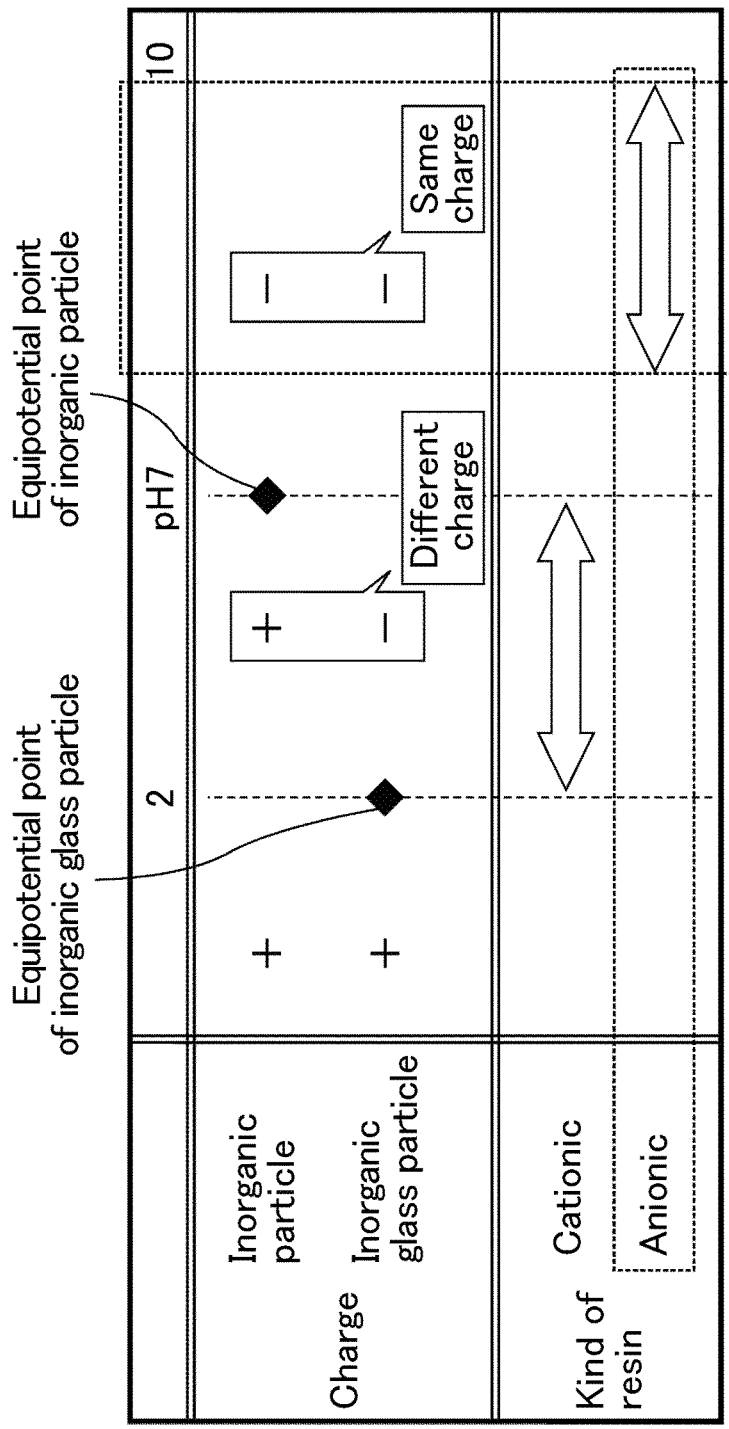
FIG. 8 is an explanatory drawing that illustrates a corresponding relationship between a pH value and an electric charge with respect to inorganic glass particles and inorganic particles according to an embodiment of the present invention.

Referring to FIG. 8, the following description will describe the reasons for this.

FIG. 8 is an explanatory drawing that illustrates a corresponding relationship between a pH value and an electric charge with respect to inorganic glass particles and inorganic particles in accordance with the embodiment of the present invention.

As shown in FIG. 8, the equipotential point of the inorganic glass particles is about a pH value of 2. Therefore, the inorganic glass particles are charged positively under an environment having a pH value smaller than 2, while the inorganic particles are charged negatively under an environment having a pH value greater than 2.

Moreover, the equipotential point of the inorganic particles is about a pH value of 7. Therefore, the inorganic particles are charged positively under an environment having a pH value smaller than 7, while the inorganic particles are charged negatively under an environment having a pH value greater than 7.

In other words, the electric charge of the inorganic glass particles is different from that of the inorganic particles under an acidic environment of pH 2 to 7, while the electric charge of the inorganic glass particles is the same as that of the inorganic particles under an alkaline environment.

Therefore, in order to allow both the inorganic glass particles and the inorganic particles to deposit simultaneously, the electrocoating process is desirably carried out under an alkaline environment.

As described above, in the anionic electrocoating process, since a base is used as a neutralizer for an anionic electrocoating resin, the electrocoating process is carried out under an alkaline environment. On the other hand, in the cationic electrocoating process, since an acid is used as a neutralizer for a cationic electrocoating resin, the electrocoating process is carried out under an acidic environment.

Therefore, the anionic electrocoating process carried out under an alkaline environment is more desirable than the cationic electrocoating process. That is, as the electrocoating resin contained in the paint, the anionic electrocoating resin is more desirably used than the cationic electrocoating resin.

As described above, the anionic electrocoating resin is more desirably used as the electrocoating resin; however, the cationic electrocoating resin may also be used. In the case of using the cationic electrocoating resin, although the cationic electrocoating resin is inferior to the anionic electrocoating resin in stability of the paint and easiness in forming concave portions, the cationic electrocoating resin is not unusable in the present embodiment.

The cationic electrocoating resin has a cationic group. The cationic group is a functional cationic group that reacts with an acid to form a salt. The cationic group is not particularly limited, and examples thereof include an amino group, a sulfide group, and a phosphine group.

Moreover, examples of the cationic electrocoating resin include, but are not particularly limited to, an acrylic resin, an epoxy resin, and a polyester resin.

In the case where the epoxy resin is an amino group-containing epoxy resin, the electrocoating resin is manufactured by opening of the epoxy ring inside the raw epoxy resin molecule through a reaction with amines such as a primary amine, a secondary amine, and a tertiary amine.

Examples of the raw epoxy resin include, but are not particularly limited to, polyphenol polyglycidyl ether-type epoxy resins that are reaction products of polycyclic phenolic compounds and epichlorohydrin, such as a bisphenol A-type epoxy resin, a bisphenol F-type epoxy resin, a bisphenol S-type epoxy resin, phenol novolac, and cresol novolac, and oxazolidone ring-containing epoxy resins that are obtained by reaction of epichlorohydrin and a diisocyanate compound or a bisurethane compound obtained by blocking an NCO group of a diisocyanate compound by a lower alcohol such as methanol, ethanol or the like.

Examples of the amines include, but are not particularly limited to, butyl amine, octyl amine, diethyl amine, dibutyl amine, methylbutyl amine, monoethanol amine, diethanol amine, N-methylethanol amine, a triethyl amine acid salt, an N,N-dimethylethanol amine acid salt, and ketimine-blocked amino group-containing polyamine.

The ketimine-blocked amino group-containing polyamine refers to an amine in which an amino group is blocked by ketimine. Examples of the ketimine-blocked amino group-containing polyamine include those obtained by converting an amino group in polyamines such as amino ethylethanol amine, diethylene triamine, dipropylene triamine, dibutylene triamine, and triethylene tetramine, to ketimine by reaction with ketones such as acetone, methylethylketone, and methylisobutylketone (for example, ketimine-blocked primary amino group-containing secondary amines, such as diethylene triamine methylisobutyl ketimine and aminoethylethanol amine methylisobutyl ketimine).

Examples of the acrylic resins include, but are not particularly limited to, those resins obtained by allowing an amine to react with the oxysilane ring of the resultant product obtained by copolymerizing (meth)acrylate, hydroxyl group-containing (meth)acrylate monomers (for example, adducts of hydroxyl group-containing (meth)acrylesters, such as 2-hydroxyethyl(meth)acrylate, 2-hydroxypropyl(meth)acrylate and 2-hydroxyethyl(meth)acrylate, and ε-caprolactone), and other acrylic and/or non-acrylic monomers, and those resins obtained by copolymerizing an acrylic monomer having an amino group without using glycidyl(meth)acrylate.

As the electrocoating resin, only one kind of the electrocoating resin may be used, or a plurality of kinds of electrocoating resins may be used.

Moreover, with respect to the paint, an organic binder material may contain only an electrocoating resin or also contain an organic binder material other than the electrocoating resin. Examples of the organic binder material other than the electrocoating resin include polyvinyl alcohol, methylcellulose and ethylcellulose. These may be used alone or two or more kinds of these may be used in combination.

The $T_g$s of the plurality of kinds of electrocoating resins are desirably different from one another.

During the electrocoating process, the flowability of the electrocoating resin is changed at temperatures in the vicinity of the $T_g$, and in the case where the $T_g$s of the plurality of kinds of electrocoating resins are different from one another, the abrupt change in the flowability of the electrocoating resin may be easily suppressed. When the $T_g$s of the plurality of kinds of electrocoating resins are different from one another, the paint is less vulnerable to influences from the temperature during the application thereof, facilitating stable manufacturing of a coat film in a comparatively wide temperature range. Consequently, the temperature dependence of the paint is easily alleviated during the application thereof. As a result, an exhaust pipe having a surface coating layer with desired concave portions formed on the surface thereof is likely to be provided.

Moreover, the $T_g$ of the electrocoating resin is desirably from about 5° C. to about 50° C.

In the case where the $T_g$ of the electrocoating resin is about 5° C. or higher, the viscosity as a coat film is not lowered, and the resin is less likely to be flowable. Consequently, during the electrocoating process, once formed on the coat film, paths are less likely to be filled with the coat film because the peripheral electrocoating resin is less likely to be softened and flown. For this reason, preferable concave portions are likely to be formed, and a surface coating layer having high emissivity is likely to be obtained. On the other hand, when the $T_g$ of the electrocoating resin is about 50° C. or lower, the electrocoating resin is not too hard at room temperature and is not easily flown. As a result, desired paths are likely to be formed on the coat film. For this reason, preferable concave portions are likely to be formed, and a surface coating layer having high emissivity is easily obtained. Moreover, in the case where the $T_g$ of the electrocoating resin is about 50° C. or lower, since the flowability of the electrocoating resin is not deteriorated, inner moisture is easily evaporated during drying and curing treatment, and extra time is not required for the drying and curing treatment. For this reason, a working efficiency is improved to decrease costs.

However, the $T_g$ of the electrocoating resin may fall outside the range from about 5° C. to about 50° C. In the case of using the plurality of kinds of electrocoating resins, an electrocoating resin having $T_g$ falling out of the range from about 5° C. to about 50° C. may be included in the plurality of kinds of electrocoating resins, or all $T_g$s of the electrocoating resins may fall outside the range from about 5° C. to about 50° C.

Additionally, $T_g$ refers to a glass transition point, and can be measured by a DSC (Differential Scanning calorimeter) according to JIS K 7121: 1987.

The weight ratio of the electrocoating resin relative to the total weight of the inorganic particles and the inorganic glass particles is desirably from about 1.0 to about 3.5.

In the case where no inorganic particles are contained in the paint, the weight ratio of the electrocoating resin relative to the weight of the inorganic glass particles is desirably from about 1.0 to about 3.5.

In the case where the weight ratio of the electrocoating resin relative to the total weight of the inorganic particles and the inorganic glass particles is about 3.5 or less (including the case where the weight of the inorganic particles is 0), since the amount of the electrocoating resin contained in the paint is not too large, the volume ratio of the inorganic particles and inorganic glass particles becomes not too low, so that the inorganic particles and the inorganic glass particles are less likely to be separated from one another in the coat film. Consequently, the inorganic particles and the inorganic glass particles are likely to be combined to each other; therefore, upon degreasing the electrocoating resin, even when the electrocoating resin is heated to be burned out, the inorganic particles and the inorganic glass particles are less likely to collapse to easily drop off. As a result, a surface coating layer having high emissivity is likely to be obtained.

On the other hand, in the case where the weight ratio of the electrocoating resin relative to the total weight of the inorganic particles and the inorganic glass particles is about 1.0 or more (including the case where the weight of the inorganic particles is 0), since the amount of the electrocoating resin is not too small, the densities of the inorganic particles and inorganic glass particles contained in the paint is not too high, and the ratio of solid-state components (particles) in the coat film deposited in the electrocoating process is also not too high. Consequently, since the flowability of the coat film during application of the electrocoating current is good, the path formation and coat film formation on the periphery of the paths easily progress. As a result, desired concave portions are also easily formed on the surface of the exhaust pipe. As a result, a surface coating layer having high emissivity is likely to be obtained. Moreover, when the amounts of the inorganic particles and inorganic glass particles contained in the paint are not too great, the precipitation of the inorganic particles and the inorganic glass particles hardly occurs, and the particle concentration in the coating solution hardly changes. Then, fluctuations in the coating conditions are less likely to be caused. As a result, stable formation of the coat film is likely to be realized. Moreover, another problem is less likely to be raised that the particles sediment onto the bottom surface of the electrocoating vessel.

However, the weight ratio of the electrocoating resin relative to the total amount of the inorganic particles and the inorganic glass particles may fall outside the range from about 1.0 to about 3.5. Moreover, in the case where no inorganic particles are contained in the paint, the weight ratio of the electrocoating resin relative to the weight of the inorganic glass particles may fall outside the range from about 1.0 to about 3.5.

In addition to the inorganic glass particles, the inorganic particles, and the organic binder material, the paint may further contain a pigment, a neutralizer, a curing agent, a dispersion medium, and various other additives.

Examples of the pigment include a colorant pigment, an extender pigment, and a rust-proofing pigment.

Examples of the colorant pigment include Titanium White, carbon black, iron oxide red, Phthalocyanine Blue, Phthalocyanine Green, monoazo yellow, disazo yellow, Benzimidazolone Yellow, Quinacridone Red, monoazo red, polyazo red, and Perylene Red.

Examples of the extender pigment include kaolin, talc, aluminum silicate, calcium carbonate, mica, clay, and silica.

Examples of the rust-proofing pigment include zinc phosphate, iron phosphate, aluminum phosphate, calcium phosphate, zinc phosphite, zinc cyanide, zinc oxide, aluminum tripolyphosphate, zinc molybdate, aluminum molybdate, calcium molybdate, aluminum phosphomolybdate, and aluminum zinc phosphomolybdate.

Examples of the neutralizer for the anionic electrocoating resin include bases, such as ammonia, organic amine, and alkali metal hydroxide.

Examples of the organic amine include diethyl amine, ethylethanol amine, diethanol amine, monoethanol amine, monopropanol amine, isopropanol amine, ethylaminoethyl amine, hydroxyethyl amine, and diethylene triamine.

Examples of the alkali metal hydroxide include sodium hydroxide and potassium hydroxide.

Examples of the neutralizer for the cationic electrocoating resin include acids, such as hydrochloric acid, nitric acid, phosphoric acid, formic acid, acetic acid, and lactic acid.

Examples of the curing agent for the anionic electrocoating resin include a melamine resin and block polyisocyanate.

Examples of the curing agent for the cationic electrocoating resin include block polyisocyanate.

The block polyisocyanate is obtained by blocking polyisocyanate using a blocking agent.

Polyisocyanate refers to a compound having two or more isocyanate groups in one molecule.

Examples of the dispersion medium include water, or organic solvents such as methanol, ethanol and acetone.

Examples of the various other additives include an additive blended for carrying out the electrocoating process, a surfactant, an antioxidant, and an ultraviolet ray absorbing agent.

Examples of the additive blended for carrying out the electrocoating process include an additive for use in controlling a zeta potential and/or adjusting the resistance value of the solution, and a stabilizer for use in ensuring the dispersibility of the inorganic glass particles and/or inorganic particles.

The above description has discussed the paint in accordance with the embodiment of the present invention.

In the embodiment of the present invention, the exhaust pipe according to the embodiment of the present invention is manufactured using the paint.

The following description will discuss a method for manufacturing the exhaust pipe according to the embodiment of the present embodiment.

Additionally, the following description will discuss the case where inorganic particles are contained in the paint.

(1) Manufacturing of Paint

The above inorganic glass particles and inorganic particles are dry-mixed to give a mixed powder.

More specifically, powder of the inorganic glass particles and powder of the inorganic particles are prepared so as to have predetermined particle size and shape, respectively. Then, the both powders are mixed at a predetermined blending ratio to give a mixed powder.

To the mixed powder thus prepared, the electrocoating resin and various additives such as water are added and mixed with one another. In this manner, the paint is manufactured.

(2) Preparation of Base Material

A base material made of a metal (metal base material) is used as a starting material. First, the metal base material is subjected to a washing treatment so that impurities are removed from the surface thereof.

The washing treatment is not particularly limited, and a conventionally known method may be used. For example, an ultrasonic washing process in an alcohol solvent may be used.

After the washing treatment, if necessary, the surface of the base material may be subjected to a roughening treatment for increasing the specific surface area of the base material or adjusting the roughness of the surface of the base material. For example, roughening treatments, such as a sandblasting treatment, an etching treatment and a high-temperature oxidizing treatment, may be carried out. These treatments may be carried out alone, or two or more of these may be carried out in combination.

(3) Formation of Coat Film

The paint manufactured in the treatment of (1) is applied to the surface of the metal base material prepared in the treatment of (2) by electrocoating. More specifically, the metal base material and an electrode plate are placed in the paint. Then, a voltage is applied thereto, wherein one of the metal base material and the electrode plates functions as an anode and the other functions as a cathode.

Then, the electrocoating resin in the soluble form carries the inorganic glass particles and the inorganic particles to the surface of the metal base material (see FIG. 7A). When brought into contact with the surface of the metal base material, the electrocoating resin changes from the soluble form to the insoluble form, and is deposited on the surface of the metal base material (see FIG. 7B and FIG. 7C). At this time, paths through which the soluble electrocoating resin is allowed to pass are formed in the coat film (see FIG. 7B and FIG. 7C). These paths are formed when the oxygen gas, which is generated when the electrocoating resin is brought into contact with the surface of the metal base material, thrusts the coat film that has already been formed aside to get into the coating solution. After the electrocoating, the electrocoating resin may remain inside the paths. Since the electrocoating resin is not deposited on the surface of the metal base material and is soluble, the resin may be washed away with water.

The electrocoating process is desirably carried out normally by applying a voltage of from about 50 V to about 450 V at a bath temperature of from about 10° C. to about 45° C. for a time period of from about 15 seconds to about 20 minutes, and the voltage is more desirably from about 60 V to about 300 V, the bath temperature is more desirably from about 26° C. to about 32° C., and a current-applying time is more desirably from about 30 seconds to about 10 minutes. Moreover, the solids concentration of the paint is desirably from about 5% by weight to about 25% by weight, and the pH of the paint is desirably from about 8.0 to about 9.5.

In the case where the voltage is about 300 V or less, a coat film of the paint that has been once formed on the surface of a body to be coated (metal base material) is less likely to be dissolved again due to heat generated on the surface of the body to be coated. As a result, the film thickness of the coat film is less likely not to grow thicker in spite of voltage application. On the other hand, in the case where the voltage is about 60 V or more, since the load voltage is not too low, the force attracting the electrocoating resin onto the body to be coated (metal base material) is less likely to be weak, so that a sufficiently thick coat film of the paint is likely to be obtained. As a result, a surface coating layer having high emissivity is likely to be obtained.

When the bath temperature is about 32° C. or lower, the electrocoating resin in the coating solution is less likely to deteriorate due to heat. As a result, since the frequency of replacement of the electrocoating resin due to deterioration of the paint does not increase, the manufacturing cost is decreased. On the other hand, in the case where the bath temperature is about 26° C. or higher, since the activity of the electrocoating resin is not lowered and the reaction rate on the surface of the body to be coated (metal base material) is not reduced, a coat film of the paint is likely to be obtained. As a result, a surface coating layer having high emissivity is likely to be obtained.

In the case where the current-applying time is about 10 minutes or less, since the current-applying time is not too long, the film thicknesses of the coat film formed of the paint is less likely to be different between the perpendicular surface and horizontal surface of the body to be coated (metal base material) because the solid components of the paint are less likely to be segmented. As a result, a surface coating layer having a uniform heat releasing characteristic over the entire surface is likely to be obtained. On the other hand, in the case where the current-applying time is about 30 seconds or more, since the current-applying time is not too short, the growth of the coat film is not stopped halfway, so that a sufficiently thick coat film formed of the paint is likely to be obtained. As a result, a surface coating layer having high emissivity is likely to be obtained.

In the case where the solids concentration of the paint is about 25% by weight or less, since the flowability of the coat film deposited by electrocoating is not lowered, so that heat and bubbles, which are generated on the surface of the body to be coated (metal base material), are easily removed. Consequently, a local temperature rise is less likely to cause a case where the coat film tends to be dissolved again in the coating solution or bubbles remaining in the coat film are thermally expanded upon heating to cause bumping, so that the surface condition of the coat film formed of the paint deteriorates. As a result, a surface coating layer having high emissivity is likely to be obtained. On the other hand, in the case where the solids concentration of the paint is about 5% by weight or more, not only the electrocoating resin is deposited on the body to be coated (metal base material), but also certain amounts of the inorganic glass particles and the inorganic particles are attached to the body to be coated (metal base material). In such a case, the coat film of the paint is easily formed. Consequently, the surface coating layer that remains on the metal base material after firing process is less likely to be thin. As a result, a surface coating layer having high emissivity is likely to be obtained.

In the case where the pH of the paint is about 9.5 or less, the coat film of the paint is easily deposited and power consumption required for electrocoating of the paint is less likely to increase. As a result, energy consumption is less likely to increase. This is presumably caused by the fact that, as a mechanism of the formation of a coat film in the electrocoating process, since the pH changes due to an electric reaction on the surface of the body to be coated (metal base material), the electrocoating resin is changed from the soluble form to the insoluble form to be deposited. In the case where the pH of the paint is about 9.5 or less, since the pH is not uselessly too high, the electrocoating resin is less likely to be kept in the soluble form not to be deposited and the coat film once deposited is less likely to be dissolved again in the coating solution when the pH is lowered by an electric reaction.

Moreover, in the case where the pH of the paint is about 9.5 or less, the coat film state of the paint is less likely to be hardly stabilized due to bubbling. As a result, a large number of voids are less likely to be generated in the coat film, the strength of the surface coating layer is less likely to be lowered, so that the high adhesion is likely to be obtained.

On the other hand, in the case where the pH of the paint is about 8.0 or more, the pH value is not in the vicinity of pH at which the electrocoating resin itself changes from the insoluble form to the soluble form so that the state of the electrocoating resin is not on a border between the soluble state and the insoluble state. In such a case, the electrocoating resin does not change its form between the soluble form and the insoluble form along with the fluctuations of the pH. Accordingly, the electrocoating resin is less likely to unstably exist in the solution. As a result, since the frequency of replacement of the electrocoating resin due to deterioration of the paint does not increase, so that the manufacturing cost is lowered.

Additionally, in the case of using an anionic electrocoating resin as the electrocoating resin, the metal base material is allowed to function as an anode, and the electrode plate is allowed to function as a cathode. On the other hand, in the case of using a cationic electrocoating resin as the electrocoating resin, the metal base material is allowed to function as a cathode, and the electrode plate is allowed to function as an anode; thus, a voltage is applied thereto.

(4) Drying and Curing

The metal base material to which the paint has been applied in the treatment of (3) is heated to a predetermined temperature so that the coat film of the paint formed on the surface of the metal base material is dried and cured. At this time, along with evaporation of moisture, volatile resin additives and the like through the paths formed in the treatment of (3), preliminary portions for concave portions are formed on the surface of the coat film (see FIG. 7D). In this case, the preliminary portions for concave portions refer to concave areas formed on the surface of the coat film, and the areas correspond to areas generated by deformed paths caused by drying and curing of the coat film.

In the present treatment, the heating temperature is desirably from about 100° C. to about 200° C., more desirably from about 110° C. to about 190° C., and furthermore desirably from about 120° C. to about 180° C.

In the case where the heating temperature is about 200° C. or lower, since the temperature is not too high, the coat film of the paint is less likely to be cured too much. As a result, wasteful energy consumption is not likely to be caused. On the other hand, in the case where the heating temperature is about 100° C. or higher, the drying and curing is less likely to become insufficient, and moisture or the solvent is less likely to remain in the coat film. As a result, upon heating in the degreasing or firing treatment, the residual moisture or solvent is less likely to cause bumping to cause rupturing of the coat film. As a result, partially unattached portions (portions where voids are present in the surface coating layer) are less likely to be formed. Moreover, since the coat film of the paint is likely to be sufficiently cured, the adhesion between the coat film and the metal base material is less likely to be lowered so that separation is less likely to occur upon handling.

Moreover, the heating temperature is preferably maintained for a predetermined period of time, and the retention time is desirably from about 5 minutes to about 90 minutes.

When the retention time is about 90 minutes or less, the coat film of the paint is less likely to be cured too much so that a waste of time is less likely to be caused. On the other hand, when the retention time is about 5 minutes or more, the drying and curing of the coat film of the paint is less likely to be insufficient, so that moisture or the solvent is less likely to remain in the coat film. As a result, upon heating in the degreasing or firing treatment, the residual moisture or solvent is less likely to cause bumping to cause rupturing of the surface coating layer. As a result, partially unattached portions (portions where voids are present in the surface coating layer) are less likely to be formed. Moreover, since the coat film of the paint is likely to be sufficiently cured, the adhesion between the coat film and the metal base material is less likely to be lowered, so that separation is less likely to occur upon handling.

(5) Degreasing

After the treatment of (4), the metal base material is heated to a temperature not lower than the burning-out temperature of the electrocoating resin so that the electrocoating resin is burned out. Thus, the volume of the coat film is contracted so that concave portions are easily formed on the surface of the coat film based on the preliminary portions for concave portions on the surface of the coat film formed in the treatment of (4) (see FIG. 7E).

The burning-out temperature of the electrocoating resin refers to a temperature at which the weight of the electrocoating resin is reduced by about 50%, and this temperature can be measured by a TG/DTA simultaneous thermal analyzer.

Although it also depends on the kind of the blended electrocoating resin, the heating temperature in this treatment is desirably from about 300° C. to about 600° C., more desirably from about 325° C. to about 550° C., and furthermore desirably from about 350° C. to about 500° C.

In the case where the heating temperature is about 600° C. or lower, since the temperature is not too high, the inorganic glass particles are less likely to be softened before completion of the degreasing of the electrocoating resin. As a result, after the inorganic glass particles have softened to start the formation of a matrix, the electrocoating resin is less likely to be burned to generate gas to cause bumping. As a result, unattached portions are less likely to be formed. On the other hand, in the case where the heating temperature is about 300° C. or higher, the electrocoating resin is less likely to be insufficiently degreased, so that resin components are less likely to remain in the coat film. For this reason, upon a temperature rise in the following firing treatment of (6), bumping is less likely to be caused so that unattached portions are less likely to be formed.

In the present treatment, the heating temperature is maintained for a predetermined period of time. The retention time is desirably from about 5 minutes to about 90 minutes.

Since the retention time of about 90 minutes is enough for completion of the degreasing of the electrocoating resin, the retention time of about 90 minutes or less is less likely to cause a waste of time. On the other hand, in the case where the retention time is about 5 minutes or more, the degreasing of the electrocoating resin is less likely to become insufficient, so that resin components are less likely to remain in the coat film. For this reason, upon a temperature rise in the firing treatment of (6), the electrocoating resin is less likely to be burned in the softened inorganic glass particles to generate a gas to cause bumping. Accordingly, holes through which the metal base material is exposed are less likely to be formed on the surface of the surface coating layer. As a result, a surface coating layer having high emissivity is likely to be obtained.

Moreover, the rate of the temperature rise from the heating temperature in the drying and curing treatment of (4) to the heating temperature in the present treatment is desirably from about 1.7° C./minute to about 60.0° C./minute, more desirably from about 2.0° C./minute to about 30.0° C./minute, and furthermore desirably from about 3.0° C./minute to about 15.0° C./minute.

In the case where the rate of the temperature rise is about 60.0° C./minute or less, bumping of the resin component is less likely to occur, so that unattached portions are less likely to be formed. On the other hand, in the case where the rate of the temperature rise is about 1.7° C./minute or more, too much time is not required for the temperature rise, so that a waste of time is less likely to be caused.

As described above, in the degreasing treatment of (5), the temperature is maintained at a predetermined temperature for a predetermined period of time. In this manner, in the degreasing treatment of (5), "maintenance at a predetermined temperature for a predetermined period" is an essential condition.

In the present embodiment, the degreasing treatment of (5) is desirably carried out; however, the firing treatment of (6) may be carried out without preliminary carrying out the degreasing treatment of (5).

The following description will be given on the premise that the degreasing treatment of (5) is preliminarily carried out.

(6) Firing

After the treatment of (5), the metal base material is heated to a temperature not lower than the softening point of the inorganic glass particles.

With this arrangement, the metal base material is likely to firmly adhere to the inorganic glass particles so that a surface coating layer that firmly adhere to the metal base material is easily formed. Moreover, since the inorganic glass particles are fused, the reduction rate of the film thickness of the coat film becomes great so that a surface coating layer with concave portions on its surface is easily formed (see FIG. 7E).

Furthermore, when the inorganic particles are present in the coat film, since the flowability of the softened inorganic glass particles is lowered, the flow of the coat film is suppressed on the periphery of concave portions. Then, a surface coating layer with concave portions on its surface is easily formed. In contrast, in the case where no inorganic particles are present in the coat film, since the flow of the coat film is not suppressed on the periphery of concave portions, it is more difficult to form a surface coating layer with concave portions on its surface in comparison with the case where the inorganic particles are present in the coat film.

The surface coating layer herein refers to a layer formed on the surface of the metal base material and is formed by firing of the coat film.

Although it also depends on the kind of the blended inorganic glass particles, the heating temperature in the present treatment is desirably from about 500° C. to about 1000° C., more desirably from about 600° C. to about 950° C., and furthermore desirably from about 700° C. to about 900° C.

In the case where the heating temperature is about 1000° C. or lower, the metal base material is less likely to deteriorate due to exposure to the high temperature. On the other hand, in the case of the heating temperature of about 500° C. or higher, the softening of the inorganic glass particles is less likely to be insufficient, so that insufficient sintering is less likely to be caused. Consequently, the coating of the paint is likely to be densified, so that sufficient adhesion is likely to be obtained between the metal base material and the surface coating layer.

Additionally, the heating temperature of the present treatment is higher than the heating temperature in the degreasing treatment of (5).

Moreover, the temperature is desirably maintained at the heating temperature for a predetermined period of time, and the retention time is desirably in a range from about 1 minute to about 30 minutes.

When the retention time is about 30 minutes or less, the metal base material is less likely to deteriorate. On the other hand, when the retention time is about 1 minute or more, the softening of the inorganic glass particles is less likely to be insufficient, so that the coating is likely to be densified. As a result, sufficient adhesion is likely to be obtained between the metal base material and the surface coating layer.

Moreover, the rate of the temperature rise from the heating temperature during the degreasing treatment of (5) to the heating temperature in the present treatment is desirably from about 3.3° C./minute to about 100.0° C./minute, more desirably from about 4.0° C./minute to about 50.0° C./minute, and furthermore desirably from about 5.0° C./minute to about 25.0° C./minute.

In the case where the rate of the temperature rise is about 100.0° C./min or less, though the heat capacity of the metal base material is great and absorbs heat, the entire metal base material is likely to be evenly heated. On the other hand, in the case where the rate of the temperature rise is about 3.3° C./minute or more, the time required for the temperature rise is not too long, so that a waste of the time is less likely to be caused.

By carrying out the above-mentioned process, the exhaust pipe according to the embodiment of the present invention having a surface coating layer formed on a metal base material is manufactured.

The description has been given on the exhaust pipe according to the embodiment of the present invention.

Now, effects of the exhaust pipe according to the embodiment of the present invention are listed.

(1) In the exhaust pipe according to the embodiment of the present invention, concave portions and convex portions are formed on the surface of the surface coating layer. Therefore, the surface area of the exhaust pipe becomes great so that the exhaust pipe is likely to have high apparent emissivity. Therefore, by accelerating the radiant heat transfer, the resultant exhaust pipe is likely to have a superior heat releasing characteristic.

Moreover, the concave portions formed on the surface of the surface coating layer are likely to serve as a number of non-fixed ends for dispersing thermal stress. Furthermore, by the concave portions formed on the surface of the surface coating layer, portions having smaller film thicknesses are formed in the surface coating layer. Since a temperature difference in each of these portions becomes small in the thickness direction, thermal stress hardly occurs inside the surface coating layer. Therefore, the thermal stress due to thermal impact is easily relieved to easily prevent separation of the surface coating layer. As a result, the exhaust pipe of the embodiment of the present invention is likely to easily maintain a high heat releasing characteristic.

(2) In the exhaust pipe according to the present embodiment, the convex portion is higher than a second reference surface having a height of $(H_{max}-H \times 1/3)$, wherein $H_{max}$ represents a maximum value of the height of the surface coating layer, $H_{min}$ represents a minimum value of the height of the surface coating layer, and H represents a difference between $H_{max}$ and $H_{min}$.

In the exhaust pipe, convex portions higher than the second reference surface are present on the peripheral edge portion. The second reference surface is a face having a height of $(H_{max}-H \times 1/3)$. Namely, in the exhaust pipe, an area much higher than the concave portion is present on the peripheral edge portion of the concave portion (i.e. comparatively in the vicinity of the concave portion). Therefore, the surface of the surface coating layer forms a steep slope from the concave portion to the convex portion. This increases the surface area to increase the apparent emissivity. This increase is likely to improve the heat releasing characteristic.

(3) In the exhaust pipe according to the present embodiment, the concave portion has a virtually circular shape when seen in a direction perpendicular to the surface of the metal base material.

This presumably allows the thermal stress due to thermal impact to be easily relieved. In the case where separation has once occurred at an edge portion of the concave portion, if the concave portion has a linear shape, the separation proceeds successively; however, in the case where the concave portion has a virtually circular shape, the separation is less likely to proceed because the separated surface coating layer is pulled by the peripheral surface coating layer therearound. As a result, the adhesion between the surface coating layer and the metal base material is likely to be improved.

(4) In the exhaust pipe according to the present embodiment, $d>0$ is preferably satisfied, wherein $H_{min}$ represents a minimum value of the height of the surface coating layer and d represents a distance between a face having a height of $H_{min}$ and the surface of the metal base material.

In the case of $d>0$, namely, in the case where the metal base material is not exposed on the surface of the exhaust pipe, the effect of improving the emissivity by the concave portion formed on the surface of the surface coating layer is likely to be achieved sufficiently. Moreover, since the metal base material has low emissivity, the effect of improving the emissivity is presumably less likely to be reduced. In the case of $d>0$, the metal base material having low emissivity is not exposed on the surface, and therefore, deterioration in the heat releasing characteristic is easily avoided.

(5) In the exhaust pipe according to the present embodiment, d≥about 2 μm is satisfied.

A predetermined distance or more between the surface of the metal base material having low emissivity and the bottom of the concave portion is likely to provide a sufficient effect of improving the emissivity by the concave portion formed on the surface of the surface coating layer, so that high emissivity is likely to be achieved. Accordingly, deterioration in the heat releasing characteristic is likely to be more effectively avoided.

(6) In the exhaust pipe according to claim 6, the concave portion has a virtually circular shape having a diameter of from about 3 μm to about 2000 μm when seen in a direction perpendicular to the surface of the metal base material.

As mentioned above, given that an increase in surface area of the surface coating layer contributes to an improvement in emissivity, desirably, the size of the concave portion is small and the density thereof is high.

However, in the case where the size of the concave portion is too small, the walls of the concave portion are made face to face with each other closely. In such a case, infrared rays radiated upon heating of the surface coating layer are hardly radiated outside of the surface coating layer, resulting in low heat releasing effect. On the other hand, since the emissivity at the concave portion is low corresponding to the small thickness of the surface coating layer, the emissivity of the entire surface coating layer is lowered when the size of the concave portion is too large, leading to a case where a high heat releasing characteristic is less likely to be obtained.

In the exhaust pipe according to the present embodiment, since the concave portion has an appropriate size, the exhaust pipe is likely to have an excellent heat releasing characteristic.

(7) In the exhaust pipe according to the present embodiment, the density of the concave portions is desirably from about 10 pics/cm² to about $10^7$ pics/cm².

Given that an increase in surface area of the surface coating layer contributes to an improvement in emissivity, the density of the concave portions is desirably high. In the case where the density of the concave portions is too low, since an increase in surface area is small, the effect for improving the emissivity is hardly obtained.

On the other hand, in the case where the density of the concave portions is too high, two concave portions are positioned too close to each other so that they may be partially overlapped with each other. When the two concave portions are overlapped with each other, a convex part is formed between the two concave portions. Since this convex part is lower than the first reference surface, this convex part is not the aforementioned convex portion, and is not continuously formed in a manner of surrounding the concave portion. Consequently, the convex part tends to be a portion that is easily separated. For this reason, separation occurs from the convex part as a starting point with an elapse of time, and the emissivity may possibly be lowered.

In the exhaust pipe according to the present embodiment, since concave portions are formed at an appropriate density, the exhaust pipe is likely to have an excellent heat releasing characteristic.

(8) In the exhaust pipe according to the present embodiment, the surface coating layer further contains inorganic particles.

Since the inorganic particles are highly emissive, infrared rays are released strongly upon heating. This is indicated by Stefan-Boltzmann law represented by the following equation (1):

$$q = \epsilon\sigma(T_1^4 - T_2^4) \quad (4)$$

$\epsilon\sigma$: Stefan-Boltzmann constant ... $5.67 \times 10^{-8}$ [W/m²·K⁴], q: heat flux [W/m²], $\epsilon$: emissivity, $T_1$: heating unit temperature [K], $T_2$: heat receiving unit temperature [K]).

Therefore, in an exhaust pipe containing inorganic particles in the surface coating layer, infrared rays are emitted from the inorganic particles in the surface coating layer. Then, the emissivity of the surface coating layer becomes high so that such an exhaust pipe is likely to have an excellent heat releasing characteristic at high temperature.

(9) In the exhaust pipe according to the present embodiment, the inorganic particles have an average particle size of not more than about 3 μm.

As mentioned above, the inorganic particles have a function for improving emissivity. For this reason, in the case where portions where the inorganic particles are present are projected onto a plane in parallel with the surface of the metal base material, the emissivity becomes greater along with the increase in the area of the projected portions.

If the average particle size of the inorganic particles is great, the inorganic particles are localized in some areas, while the other areas lack the inorganic particles. In this case, the above area is small. Consequently, the emissivity is lowered.

That is, in the case where the ratio of the inorganic particles contained in the surface coating layer is constant, the area becomes larger along with the reduction in the average particle size of the inorganic particles.

In the exhaust pipe according to the present embodiment, since the inorganic particles having an average particle size of not more than about 3 μm are used, the exhaust pipe is likely to have an excellent heat releasing characteristic at high temperature.

(10) In the exhaust pipe according to the present embodiment, the inorganic particles have an average interparticle distance of not more than about 3 lam.

As mentioned above, the inorganic particles have a function for improving emissivity. For this reason, in the case where portions where the inorganic particles are present are projected onto a plane in parallel with the surface of the metal base material, the emissivity becomes greater along with the increase in the area of the projected portions.

If the interparticle distance of the inorganic particles is great, the inorganic particles are localized in some areas, while the other areas lack the inorganic particles. In this case, the above area is small. Consequently, the emissivity is lowered.

That is, in the case where the ratio of the inorganic particles contained in the surface coating layer is constant, the area becomes larger along with the reduction in the interparticle distance of the inorganic particles.

In the exhaust pipe according to the present embodiment, since the average interparticle distance of the inorganic particles is small as about 3 μm, the exhaust pipe is likely to have a superior heat releasing characteristic at high temperature.

EXAMPLES

The following description will discuss the present invention in detail by means of examples; however, the present invention is not limited to these examples.

Example 1

(1) Manufacturing of Paint

As powder of inorganic particles, a powder of a metal oxide composed of $MnO_2$ powder (24 parts by weight), FeO powder (8 parts by weight), CuO powder (4 parts by weight) and CoO powder (4 parts by weight) was prepared. The inorganic particles had an average particle size of 0.8 μm.

Moreover, as a powder of inorganic glass particles, K807 (60 parts by weight) ($SiO_2$—$BaO$-$B_2O_3$ glass powder, softening point: 720° C.), manufactured by Asahi Glass Co., Ltd. was prepared. The inorganic glass particles had an average particle size of 0.9 μm.

The powder of the inorganic particles and the powder of the inorganic glass particles were dry-mixed to prepare a mixed powder.

Moreover, to a reaction container were added a monomer composition, a solvent and a polymerization initiator. Then, the monomer composition was polymerized so that an anionic electrocoating resin was manufactured. More specifically, as the monomer composition, ethyl acrylate (13 parts by weight), 2-ethylhexyl methacrylate (30 parts by weight), methyl methacrylate (31 parts by weight), acrylic acid (9 parts by weight), 2-hydroxyethyl acrylate (17 parts by weight) and N-methylol methacryl amide (4 parts by weight) were added. As the solvent, isopropyl alcohol (IPA) (54 parts by weight) and butyl cellosolve (15 parts by weight) were added thereto. As the polymerization initiator, azobis isobutylonitrile (3 parts by weight) was added thereto.

To the mixed powder, the anionic electrocoating resin (170 parts by weight), obtained by the polymerization, was added and mixed as an organic binder.

Thereafter, pure water (1500 parts by weight) and other various additives were added and mixed so that a paint was manufactured.

The solids concentration of the paint thus manufactured was 15% by weight.

Measurement using a DSC (differential scanning calorimeter) (EXSTAR DSC6220, manufactured by SII-Nanotechnology Inc.) clarified that $T_g$ of the anionic electrocoating resin was 25° C.

(2) Preparation of Metal Base Material

As a metal base material, a plate-shaped stainless base material (made of SUS430) having a width of 100 mm, a length of 100 mm and a thickness of 2 mm was prepared. This metal base material was subjected to ultrasonic washing in an alcohol solvent, and subsequently subjected to a sandblasting process so as to roughen the surface of the metal base material. The sandblasting process was carried out using $Al_2O_3$ abrasive grains of #100 for 10 minutes.

Measurement using a surface-roughness measuring machine (HANDY SURF E-35B, manufactured by Tokyo Seimitsu Co., Ltd.) clarified that the surface roughness $Rz_{JIS}$ of the metal base material was 8.8 μm.

(3) Formation of Coat Film

The paint (0.7 g) prepared in the treatment of (1) was uniformly applied to the surface of the metal base material obtained in the treatment of (2) by an electrocoating process. More specifically, the metal base material and an electrode plate were placed in the paint, and by allowing the metal base material and the electrode plate to function respectively as an anode and a cathode, and a voltage was applied.

The electrocoating process was carried out under conditions of a voltage of 100 V, a bath temperature of 26° C. to 32° C., and a time for 3 minutes, while the paint was stirred with a rotary stirrer. The solids concentration of the paint was 15% by weight, and the pH thereof was in a range from 8.0 to 9.5.

(4) Drying and Curing

The metal base material coated with the paint in the treatment of (3) was heated at 160° C. for 60 minutes in a drying apparatus so that the coat film of the paint formed on the surface of the metal base material was dried and cured.

(5) Degreasing

After the treatment of (4), the metal base material was heated in a heating furnace at 400° C. for 60 minutes so that the electrocoating resin contained in the coat film was burned out.

The rate of the temperature rise from the heating temperature (160° C.) in the drying and curing treatment of (4) to the heating temperature (400° C.) in the present treatment was 4.0° C./minute.

(6) Firing

After the treatment of (5), the metal base material was heated in a heating furnace at 850° C. for 20 minutes so that the coat film was fired.

The rate of the temperature rise from the heating temperature (400° C.) in the degreasing treatment of (5) to the heating temperature (850° C.) in the present treatment was 9.0° C./minute.

By carrying out the above-mentioned process, a baked sample of the paint in which a surface coating layer was formed on the metal base materials was manufactured.

Example 2

A baked sample of the paint was manufactured in the same manner as in Example 1, except that in the treatment of (1) for manufacturing a paint, the amount of the powder of inorganic particles blended was 0 part by weight so that the paint contained no inorganic particles, and that the amount of the powder of inorganic glass particles blended was 100 parts by weight.

Example 3

A baked sample of the paint was manufactured in the same manner as in Example 1, except that the rate of the temperature rise was accelerated.

The rate of the temperature rise from the heating temperature (160° C.) in the drying and curing treatment of (4) to the heating temperature (400° C.) in the degreasing treatment of (5) was 15.0° C./minute.

The rate of the temperature rise from the heating temperature (400° C.) in the degreasing treatment of (5) to the heating temperature (850° C.) in the firing treatment (6) was 25.0° C./minute.

Example 4

A baked sample of the paint was manufactured in the same manner as in Example 1, except that the rate of the temperature rise was accelerated.

The rate of the temperature rise from the heating temperature (160° C.) in the drying and curing treatment of (4) to the heating temperature (400° C.) in the degreasing treatment of (5) was 10.0° C./minute.

The rate of the temperature rise from the heating temperature (400° C.) in the degreasing treatment of (5) to the heating temperature (850° C.) in the firing treatment of (6) was 15.0° C./minute.

Example 5

A baked sample of the paint was manufactured in the same manner as in Example 1, except that the rate of the temperature rise was delayed.

The rate of the temperature rise from the heating temperature (160° C.) in the drying and curing treatment of (4) to the heating temperature (400° C.) in the degreasing treatment of (5) was 2.0° C./minute.

The rate of the temperature rise from the heating temperature (400° C.) in the degreasing treatment of (5) to the heating temperature (850° C.) in the firing treatment of (6) was 4.0° C./minute.

Example 6

A baked sample of the paint was manufactured in the same manner as in Example 1, except that in the treatment of (1) for manufacturing a paint, inorganic particles having an average particle size of 3.8 μm and inorganic glass particles having an average particle size of 4.3 μm were used.

Reference Example 1

A baked sample of the paint was manufactured in the same manner as in Example 1, except the following. Namely, in the treatment of (1) for manufacturing a paint, methylcellulose (Methylcellulose 25 manufactured by Kishida Chemical Co., Ltd.) was used instead of the anionic electrocoating resin as the organic binder material. The two types of the inorganic particles respectively having an average particle size of 3.8 μm and 4.3 μm were used. In the treatment of (3) for forming a coat film, the paint was applied by spray coating (mist coating) instead of an electrocoating process. The firing treatment of (6) was carried out without carrying out the degreasing treatment of (5).

The rate of the temperature rise from the heating temperature (160° C.) in the drying and curing treatment of (4) to the heating temperature (850° C.) in the firing treatment of (6) was 9.0° C./minute.

Thereafter, by using a cutter, cuts were formed on the baked sample of the paint in the longitudinal and lateral directions in a grid pattern at a density of 30 lines/cm so that concave portions were formed on the baked sample of the paint.

Comparative Example 1

A baked sample of the paint was manufactured in the same manner as in Reference Example 1; however, no concave portions were formed on the baked samples of the paint. Here, the baked sample of Comparative Example 1 corresponds to the conventional art (for example, the techniques described in JP-A 2009-133213 and JP-A 2009-133214).

Comparative Example 2

A baked sample of the paint was manufactured in the same manner as in Comparative Example 1, except that in the treatment of (1) for manufacturing a paint, the amount of the powder of inorganic particles blended was 0 part by weight so that the paint contained no inorganic particles, and that the amount of the powder of inorganic glass particles blended was 100 parts by weight.

Tables 1A and 1B show the formulations of the paints and the conditions for manufacturing of the baked samples of the paints in Examples 1 to 6, Reference Example 1, and Comparative Examples 1 to 2.

TABLE 1A

| | Paint | | | | | | | |
|---|---|---|---|---|---|---|---|---|
| | Inorganic glass particles | | Inorganic particles | | | Organic binder material | | |
| | Type | Average particle size (μm) | Type | Compounding ratio | Average particle size (μm) | Type | | Tg (° C.) |
| Example 1 | $SiO_2$—BaO—$B_2O_3$ type | 0.9 | $MnO_2$—FeO—CuO—CoO | 6:2:1:1 | 0.8 | Electrocoating resin | Anionic | 25 |
| Example 2 | $SiO_2$—BaO—$B_2O_3$ type | 0.9 | — | — | — | Electrocoating resin | Anionic | 25 |
| Example 3 | $SiO_2$—BaO—$B_2O_3$ type | 0.9 | $MnO_2$—FeO—CuO—CoO | 6:2:1:1 | 0.8 | Electrocoating resin | Anionic | 25 |
| Example 4 | $SiO_2$—BaO—$B_2O_3$ type | 0.9 | $MnO_2$—FeO—CuO—CoO | 6:2:1:1 | 0.8 | Electrocoating resin | Anionic | 25 |
| Example 5 | $SiO_2$—BaO—$B_2O_3$ type | 0.9 | $MnO_2$—FeO—CuO—CoO | 6:2:1:1 | 0.8 | Electrocoating resin | Anionic | 25 |
| Example 6 | $SiO_2$—BaO—$B_2O_3$ type | 4.3 | $MnO_2$—FeO—CuO—CoO | 6:2:1:1 | 3.8 | Electrocoating resin | Anionic | 25 |
| Reference Example 1 | $SiO_2$—BaO—$B_2O_3$ type | 4.3 | $MnO_2$—FeO—CuO—CoO | 6:2:1:1 | 3.8 | Methylcellulose | — | — |
| Comparative Example 1 | $SiO_2$—BaO—$B_2O_3$ type | 4.3 | $MnO_2$—FeO—CuO—CoO | 6:2:1:1 | 3.8 | Methylcellulose | — | — |
| Comparative Example 2 | $SiO_2$—BaO—$B_2O_3$ type | 4.3 | — | — | — | Methylcellulose | — | — |

TABLE 1B

| | Process | | | |
|---|---|---|---|---|
| | Degreasing (400° C.) | Temperature rise ~400° C. [° C./min.] | Firing (850° C.) | Temperature rise ~850° C. [° C./min.] |
| Exampel 1 | Degreased | 4.0 | Fired | 9.0 |
| Example 2 | Degreased | 4.0 | Fired | 9.0 |
| Example 3 | Degreased | 15.0 | Fired | 25.0 |
| Example 4 | Degreased | 10.0 | Fired | 15.0 |
| Example 5 | Degreased | 2.0 | Fired | 4.0 |
| Example 6 | Degreased | 4.0 | Fired | 9.0 |

TABLE 1B-continued

| | Process | | | |
|---|---|---|---|---|
| | Degreasing (400° C.) | Temperature rise ~400° C. [° C./min.] | Firing (850° C.) | Temperature rise ~850° C. [° C./min.] |
| Reference Example 1 | Not degreased | — | Fired | 9.0 |
| Comparative Example 1 | Not degreased | — | Fired | 9.0 |
| Comparative Example 2 | Not degreased | — | Fired | 9.0 |

The following evaluations were carried out on the baked samples of the paints of Examples 1 to 6, Reference Example 1, and Comparative Examples 1 to 2. Tables 2A and 2B show the results.

TABLE 2A

| | Thickness of the surface coating layer (μm) | Concave portions | Shape of concave portions | Diameter of concave portion (μm) | Density of concave portions (pcs/cm$^2$) | Film thickness of concave portion (μm) |
|---|---|---|---|---|---|---|
| Example 1 | 6.2 | Present | Circle | 102 | about 10$^3$ | 3.1 (Not penetrated) |
| Example 2 | 5.6 | Present | Circle | 93 | about 10$^3$ | 2.8 (Not penetrated) |
| Example 3 | 5.8 | Present | Circle | 960 | about 10$^3$ | 0.0 (Penetrated) |
| Example 4 | 6.3 | Present | Circle | 800 | about 10$^3$ | 2.0 (Not penetrated) |
| Example 5 | 6.5 | Present | Circle | 104 | 10 | 2.4 (Not penetrated) |
| Example 6 | 5.8 | Present | Circle | 112 | about 10$^3$ | 2.8 (Not penetrated) |
| Reference Example 1 | 6.1 | Present | Line | 510 | (about 10$^3$) | 3.5 (Not penetrated) |
| Comparative Example 1 | 5.8 | Not present | — | — | — | — |
| Comparative Example 2 | 5.7 | Not present | — | — | — | — |

TABLE 2B

| | Ervaluation results | | | |
|---|---|---|---|---|
| | Emissivity | | Therma 1 | |
| | Measured value | Evaluation | impact resistance Evaluation | General Evaluation |
| Example 1 | 0.87 | Excellent | Good | Excellent |
| Example 2 | 0.84 | Good | Good | Good |
| Example 3 | 0.82 | Passing | Good | Good |
| Example 4 | 0.85 | Good | Good | Good |
| Example 5 | 0.82 | Passing | Good | Good |
| Example 6 | 0.82 | Passing | Good | Good |
| Reference Example 1 | 0.83 | Good | Low | Low |
| Comparative Example 1 | 0.81 | Low | Low | Poor |
| Comparative Example 2 | 0.80 | Poor | Poor | Poor |

(Evaluation of Emissivity)

The emissivity of the baked samples of the paints of Examples 1 to 6, Reference Example 1, and Comparative Examples 1 to 2 was measured using an emissivity meter D&S AERD manufactured by KEM.

Evaluation results of the emissivity in Tables 2A and 2B were given based on 5 ranks of "Excellent", "Good", "Passing", "Low" and "Poor". In this case, the rank "Low" indicates that there were no changes in emissivity in comparison with that of Comparative Example 1 (conventional art). The rank "Passing" indicates that the emissivity was slightly improved (0.01) in comparison with that of Comparative Example 1 (conventional art). The rank "Good" indicates that the emissivity was relatively (0.02 to 0.05) improved in comparison with that of Comparative Example 1 (conventional art). The rank "Excellent" indicates that the emissivity was remarkably (0.06 or more) improved in comparison with that of Comparative Example 1 (conventional art). The rank "Poor" indicates that the emissivity became worse in comparison with that of Comparative Example 1 (conventional art).

The results of evaluations of emissivity show that Example 1 corresponds to "Excellent", Examples 2 and 4 and Reference Example 1 correspond to "Good", Examples 3, 5 and 6 correspond to "Passing", Comparative Example 1 corresponds to "Low", and Comparative Example 2 corresponds to "Poor".

(Evaluation of Heat Impact Resistance)

The baked samples of the paints of Examples 1 to 6, Reference Example 1, and Comparative Examples 1 to 2 each were heated in a heating furnace at 850° C. for 10 minutes, and the resultant samples were put into water at 25° C. without a cooling period of time, and visually observed as to whether or not any drop off or crack occurred in the surface coating layers (baked coatings formed of the paints).

Evaluation results of the heat impact resistance in Tables 1A and 1B are given based on 3 ranks of "Good", "Low" and "Poor". In this case, the rank "Good" indicates that there were neither drops off nor cracks. The rank "Low" indicates that although there was no drop off, cracks occurred. Moreover, the rank "Poor" indicates that cracks as well as drop off occurred. Between drop off and cracks, since the drop off causes more damages to the surface coating layer than the cracks, the occurrence of drop off is determined as "Poor".

The results of evaluations of heat impact resistance show that examples 1 to 6 correspond to "Good", Reference example 1 and Comparative Example 1 correspond to "Low", and Comparative Examples 2 corresponds to "Poor".

(General Evaluation)

Based on the evaluations of emissivity and heat impact resistance, a general evaluation as shown in Tables 2A and 2B was given as to the results of Examples 1 to 6, Reference Example 1, and Comparative Examples 1 to 2.

The general evaluation is given based on 4 ranks of "Excellent", "Good", "Low" and "Poor". In the case where the sample ranked "Excellent" in the evaluation of emissivity is ranked "Good" in the evaluation of heat impact resistance, this case is evaluated as "Excellent". In the case where the sample ranked "Good" or "Passing" in the evaluation of emissivity is ranked "Good" in the evaluation of heat impact resistance, this case is evaluated as "Good". In the case where the sample ranked "Good" in the evaluation of emissivity is ranked "Low" in the evaluation of heat impact resistance, this case is evaluated as "Low". In the case where the sample ranked "Passing", "Low" or "Poor" in the evaluation of emissivity is ranked "Low" or "Poor" in the evaluation of heat impact resistance, this case is evaluated as "Poor".

Here, the rank "Excellent" is the best evaluation and corresponds to the evaluation of Example 1. The rank "Good" is the second best evaluation and corresponds to the evaluations of Examples 2 to 6. The rank "Low" is the third evaluation and corresponds to the evaluation of Reference Example 1. The rank "Poor" is the worst evaluation and corresponds to the evaluations of Comparative Examples 1 and 2.

Along with the determination of the presence of the concave portions on the surface coating layer and observation of the shape of the concave portions, the film thickness (distance D in FIG. 3) of the surface coating layer, the diameter of the concave portion, the density of the concave portions, and the film thickness of the concave portion (see distance d in FIG. 3) were measured. The film thickness of the surface coating layer was obtained by measuring the cross section of each test piece by SEM. The diameter of the concave portion was obtained by measuring the surface of each test piece by SEM. The density of the concave portions was obtained by measuring the surface of each test piece by SEM. The film thickness of the concave portion was obtained by measuring the cross section of each test piece by SEM. Tables 2A and 2B show the results.

The concave portion was determined to be "present" if a convex portion is present on the peripheral edge portion in the area (potential concave portion) lower than the first reference surface.

The shape of the concave portion refers to a shape viewed in the direction perpendicular to the surface of the base material. In the case where the shape is a virtually circular shape, the maximum length of a straight line drawn in the circle is defined as a diameter of the concave portion, while in the case where the shape is a linear shape, the width of the straight line is defined as a diameter of the concave portion.

In Tables 2A and 2B, "penetrated" refers to the fact that "the concave portion penetrates the surface coating layer", that is, the film thickness of the concave portion d=0, and "Not penetrated" refers to the fact that "the concave portion does not penetrate the surface coating layer", that is, the film thickness of the concave portion d>0.

In the general evaluation, Examples 1 to 6 and Reference Example 1 are ranked higher than Comparative Examples 1 and 2.

This evaluation is presumably led by the fact that concave portions were present in Examples 1 to 6 and Reference Example 1, while no concave portions were present in Comparative Examples 1 and 2.

In the general evaluation, Examples 1 to 6 are ranked higher than Reference Example 1.

This evaluation is presumably led by the fact that the concave portions in Examples 1 to 6 each had a virtually circular shape, while the concave portions in Reference Example 1 had a virtually linear shape.

The emissivity was 0.87 in Example 1 and 0.84 in Example 2, and therefore, Example 1 is ranked higher than Example 2.

This result is presumably led by the fact that the paint containing inorganic particles was used in Example 1, while the paint containing no inorganic particles was used in Example 2.

Namely, the evaluation is based on the fact that, as described in the effect (7) of the exhaust pipe of the embodiment of the present invention, in Example 1, use of the paint containing inorganic particles caused infrared radiation from the inorganic particles in the surface coating layer. Moreover, presence of the inorganic particles reduced the fluidity of the inorganic glass particles softened during firing. This suppressed the flow of the coat film in the vicinity of the concave portions. As a result, favorable concave portions were formed on the surface of the surface coating layer.

In the evaluation of the emissivity, Example 4 (Emissivity: 0.85) was ranked higher than Example 3 (Emissivity: 0.82).

This evaluation is presumably based on the difference in the film thickness (presence of penetration) of the concave portions. In this case, the film thickness of the concave portions was 0.0 μm (penetrated) in Example 3 and 2.0 μm (not penetrated) in Example 4.

Namely, the evaluation is based on the fact that, as described in the effect (3) of the exhaust pipe of the embodiment of the present invention, in Example 4, the metal base material having low emissivity was not exposed on the surface.

In the evaluation of the emissivity, Example 1 (Emissivity: 0.87) was ranked higher than Example 5 (Emissivity: 0.82).

This result is presumably based on the difference in the density of the concave portions. In this case, the density was 10 pcs/cm$^2$ in Example 5 and about 10$^3$ pcs/cm$^2$ in Example 1.

The measured values of the emissivity was larger in Example 1 (Emissivity: 0.87) than in Example 4 (Emissivity: 0.85).

This result is led by the difference in the film thickness of the concave portions. In this case, the film thickness of the concave portions was 2.0 μm (not penetrated) in Example 4 and 3.1 μm (not penetrated) in Example 1.

Namely, this result is led by the fact that the distance between the surface of the metal base material having low emissivity and the bottom of the concave portion was longer in Example 1 than in Example 4 (see effect (4) according to the present embodiment).

Moreover, in the evaluation of the emissivity, Example 1 (emissivity: 0.87) was ranked higher than Example 6 (emissivity: 0.82).

This evaluation is led by the fact that, while Example 6 used inorganic glass particles having a large average particle size of 4.3 μm and inorganic particles having a large average particle size of 3.8 μm, Example 1 used inorganic glass particles having a small average particle size of 0.9 μm and inorganic particles having a small average particle size of 0.8 μm.

That is, this evaluation is led by the fact that, in Example 1, use of the inorganic glass particles having a small average particle size and inorganic particles having a small average particle size enabled to stabilize the inorganic glass particles and inorganic particles in the paint solution, leading to formation of desirable concave portion on the surface of the surface coating layer.

OTHER EMBODIMENTS

As described in the embodiments of the exhaust pipe of the embodiment of the present invention, the shape of the metal base material is desirably a substantially cylindrical shape. However, the shape of the metal base material is not limited to the substantially cylindrical shape, and may be a substantially plate shape or a substantially semi-cylindrical shape, and the shape of the cross section may be a substantially circular shape, or may be other shapes, such as an substantially elliptical shape and a substantially polygonal shape.

The face of the metal base material to be coated with a paint is not necessarily limited to the entire outer peripheral face of the metal base material, and may be a part of the outer peripheral face of the metal base material.

However, in the case where only a part of the outer peripheral face of the metal base material is coated with the paint, the area of the part coated with the paint is desirably about 10% or more, more desirably about 50% or more, and furthermore desirably about 80% or more of the entire area of the outer peripheral face of the metal base material. In the case where the area of the part coated with the paint is about 10% or more of the entire area of the outer peripheral face of the metal base material, the area coated with the paint is not too small, the internal temperature rise of the exhaust pipe is likely to be effectively suppressed.

In the case of using a substantially cylindrical metal base material, the surface coated with the paint may be not the outer peripheral face, but the inner circumferential face of the metal base material. In this case, the outer peripheral face of the metal base material refers to a surface having a larger area of surfaces of the metal base material, and the inner circumferential face of the metal base material refers to a surface having a smaller area thereof.

Moreover, both surfaces of the metal base material may be coated with a paint.

In the exhaust pipe of the embodiment of the present invention, presence of a concave portion and a convex portion on the surface of the surface coating layer is an essential structural feature.

By combining the essential structural feature with various structural elements described in the embodiments in detail (such as the kind of inorganic glass base material, the kind of inorganic particles and the like) appropriately, it becomes possible to obtain desired effects.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An exhaust pipe comprising:
    a metal pipe having an outer circumferential surface;
    a surface coating layer provided on the outer circumferential surface of the metal pipe, the surface coating layer containing an inorganic glass base material and having concave portions and convex portions on an outer surface of the surface coating layer, the concave portions and the convex portions being constructed using electrocoating with an electrocoating resin;
    the concave portions having a virtually circular shape when seen in a direction perpendicular to the outer circumferential surface of the metal pipe and being lower than a first reference surface, the first reference surface having an average height of the outer surface of the surface coating layer; and
    the convex portions being located on peripheral edge portions of the concave portions and surrounding the concave portions, the convex portions being higher than the first reference surface.

2. The exhaust pipe according to claim 1,
wherein
the convex portions are higher than a second reference surface, the second reference surface having a height of $(H_{max} - H \times 1/3)$, wherein $H_{max}$ represents a maximum height of the surface coating layer, $H_{min}$ represents a minimum height of the surface coating layer, and H represents a difference between $H_{max}$ and $H_{min}$.

3. The exhaust pipe according to claim 1,
wherein
d>0 is satisfied,
    wherein $H_{min}$ represents a minimum height of the surface coating layer and d represents a distance between a face having a height of $H_{min}$ and the outer circumferential surface of the metal pipe.

4. The exhaust pipe according to claim 3,
wherein
d≥about 2 μm is satisfied.

5. The exhaust pipe according to claim 1,
wherein
the concave portions have a virtually circular shape having a diameter of about 3 μm to about 2000 μm when seen in a direction perpendicular to the outer circumferential surface of the metal pipe.

6. The exhaust pipe according to claim 1,
wherein
a density of the concave portions is about 10 pcs/cm² to about $10^7$ pcs/cm².

7. The exhaust pipe according to claim 1,
wherein
the surface coating layer further contains inorganic particles.

8. The exhaust pipe according to claim 7,
wherein
the inorganic particles have an average particle size of not more than about 3 μm.

9. The exhaust pipe according to claim 7,
wherein
the inorganic particles have an average interparticle distance of not more than about 3 μm.

10. The exhaust pipe according to claim 7,
wherein
the inorganic particles are formed of an oxide of a transition metal.

11. The exhaust pipe according to claim 1,
wherein
the inorganic glass base material has a softening point of about 300° C. to about 1000° C.

12. The exhaust pipe according to claim 1,
wherein
the peripheral edge portions are an area of a graphic form F(2) excluding the concave portions in a view observed in a direction perpendicular to the outer circumferential surface of the metal pipe,
    wherein F(1) represents a graphic form provided by the concave portions, F(2) represents a graphic form similar to F(1) with a same center of gravity as F(1), and a ratio of similitude of F(1) to F(2) is F(1):F(2)=1:1.2.

13. The exhaust pipe according to claim 12,
wherein
    about 60% or more of the peripheral edge portions of the concave portions is occupied by the convex portions.

* * * * *